(12) United States Patent
Shimizu et al.

(10) Patent No.: US 8,262,527 B2
(45) Date of Patent: Sep. 11, 2012

(54) TRANSMISSION APPARATUS AND VEHICLE HAVING THE SAME

(75) Inventors: Tetsuya Shimizu, Anjo (JP); Kenichi Tsuchida, Hazu (JP); Yoshimitsu Hyodo, Nishio (JP); Naoyuki Fukaya, Okazaki (JP); Kazunori Ishikawa, Toyota (JP); Hironori Sugiura, Hekinan (JP); Satoshi Nishio, Kouta (JP); Kazuki Kojima, Kariya (JP)

(73) Assignee: Aisin AW Co., Ltd., Anjo (JP)

( * ) Notice: Subject to any disclaimer, the term of this patent is extended or adjusted under 35 U.S.C. 154(b) by 473 days.

(21) Appl. No.: 12/585,343

(22) Filed: Sep. 11, 2009

(65) Prior Publication Data
US 2010/0144488 A1 Jun. 10, 2010

(30) Foreign Application Priority Data
Sep. 12, 2008 (JP) ................. 2008-235747

(51) Int. Cl.
*F16H 31/00* (2006.01)
*F16H 61/26* (2006.01)
(52) U.S. Cl. ........................ 475/134; 477/127
(58) Field of Classification Search .................. 475/127, 475/131, 134; 477/127, 130, 143, 162
See application file for complete search history.

(56) References Cited

U.S. PATENT DOCUMENTS

| 5,334,114 | A | 8/1994 | Ando et al. |
| 5,720,694 | A * | 2/1998 | Jang ............................... 477/116 |
| 5,725,455 | A | 3/1998 | Kamada et al. |
| 6,027,427 | A * | 2/2000 | Yoo ............................... 477/130 |
| 6,537,180 | B2 * | 3/2003 | Kim et al. ..................... 477/130 |
| 6,746,355 | B2 * | 6/2004 | Shin et al. ..................... 475/119 |
| 6,805,649 | B2 * | 10/2004 | Kim et al. ..................... 475/128 |
| 6,843,754 | B2 * | 1/2005 | Mori et al. ..................... 477/92 |
| 2002/0137587 | A1 * | 9/2002 | Futamura ..................... 475/127 |

FOREIGN PATENT DOCUMENTS

| JP | A-5-157164 | 6/1993 |
| JP | A 08-145161 | 6/1996 |
| JP | A 08-277916 | 10/1996 |
| JP | A 08-326888 | 12/1996 |

OTHER PUBLICATIONS

International Search Report mailed Dec. 22, 2009 for PCT/JP2009/065953.

* cited by examiner

*Primary Examiner* — Roger Pang
(74) *Attorney, Agent, or Firm* — Oliff & Berridge, PLC

(57) ABSTRACT

A transmission apparatus including an automatic transmission that is mounted in a vehicle and is capable of engaging a first engagement element and a second engagement element among a plurality of engagement elements when shift-operated to a reverse position, and engaging the first engagement element when shift-operated to a neutral position.

13 Claims, 12 Drawing Sheets

FIG. 2

|   |   | C-1 | C-2 | C-3 | B-1 | B-2 | F-1 | SLC1 | SLC2 | SLC3 | SLB1 | S1 | S2 |
|---|---|---|---|---|---|---|---|---|---|---|---|---|---|
| P |   |   |   |   |   |   |   |   |   | ○ |   | ○ |   |
| REV |   |   |   | ○ |   | ○ |   |   |   | ○ |   | ○ |   |
| N |   |   |   |   |   | ○ |   |   |   |   |   | ○ | ○ |
| D | 1st | ○ |   |   |   | ○ | ○ | ○ | ○ | ○ |   |   | ○ |
| D | 2nd | ○ |   |   | ○ |   |   | ○ |   | ○ | ○ | ○ |   |
| D | 3rd | ○ |   | ○ |   |   |   | ○ |   |   |   | ○ |   |
| D | 4th | ○ | ○ |   |   |   |   | ○ | ○ | ○ |   | ○ |   |
| D | 5th |   | ○ | ○ |   |   |   |   | ○ |   |   | ○ |   |
| D | 6th |   | ○ |   | ○ |   |   |   |   | ○ | ○ | ○ |   |

F I G . 7
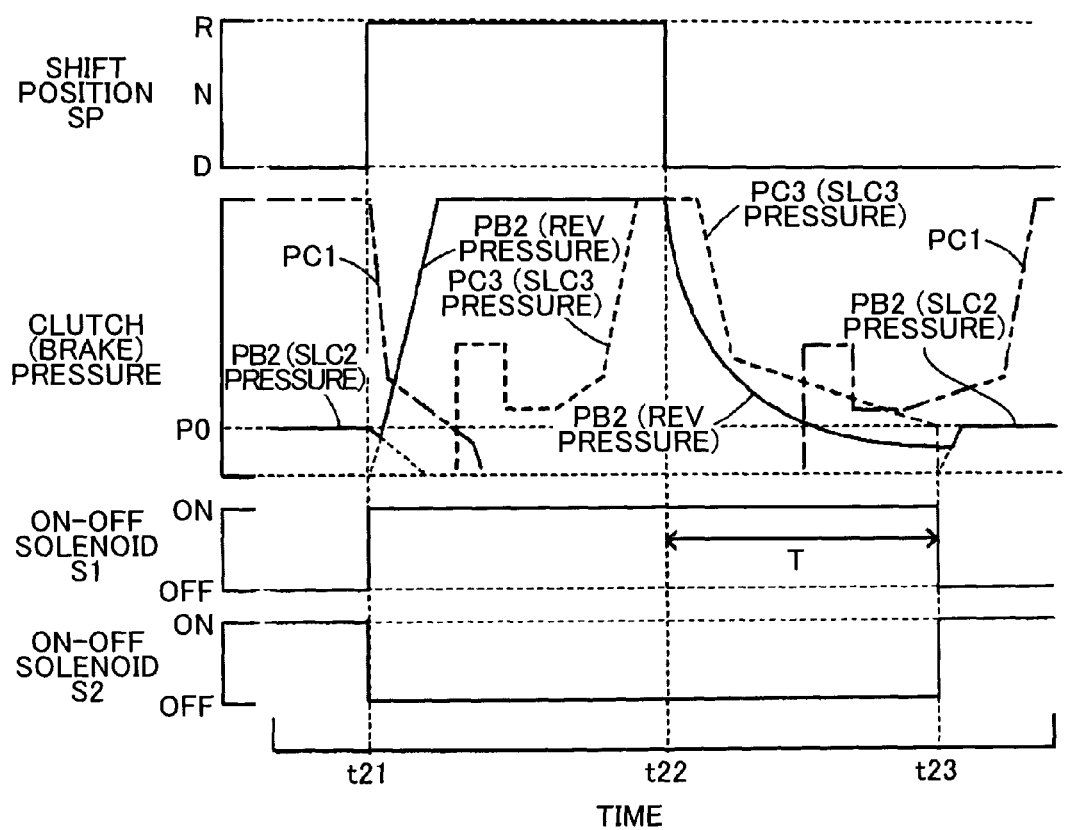

|   |     | C-1 | C-2 | C-3 | B-1 | B-2 | F-1 | SLC1 | SLC2 | SLC3 | SLB1 | S1 |
|---|-----|-----|-----|-----|-----|-----|-----|------|------|------|------|----|
|   | P   |     |     |     |     | O   |     |      |      | O    |      | O  |
|   | REV |     |     | O   |     | O   |     |      |      | O    |      |    |
|   | N   |     |     |     |     | O   |     |      |      | O    |      | O  |
| D | 1st | O   |     |     |     | O   | O   | O    |      | O    |      |    |
|   | 2nd | O   |     |     | O   |     |     | O    |      |      | O    |    |
|   | 3rd | O   |     | O   |     |     |     | O    |      | O    |      |    |
|   | 4th | O   | O   |     |     |     |     | O    | O    |      |      |    |
|   | 5th |     | O   | O   |     |     |     |      | O    | O    |      |    |
|   | 6th |     | O   |     | O   |     |     |      | O    |      | O    |    |

TRANSMISSION APPARATUS AND VEHICLE HAVING THE SAME

INCORPORATION BY REFERENCE

The disclosure of Japanese Patent Application No. 2008-235747 filed on Sep. 12, 2008, including the specification, drawings and abstract is incorporated herein by reference in its entirety.

BACKGROUND

The present invention relates to a transmission apparatus and a vehicle, and particularly relates to a transmission apparatus including an automatic transmission that is mounted in a vehicle and is capable of engaging a first engagement element and a second engagement element among a plurality of engagement elements when shift-operated to a reverse position and engaging the first engagement element when shift-operated to a neutral position, and to a vehicle having the same.

Conventionally, as this kind of transmission apparatus, one is proposed which selectively turns on or off three clutches C-0 to C-2 and five brakes B-0 to B-4 based on an operation of a select lever for switching among ranges, so as to switch among a parking (P) range, a reverse (R) range, a neutral (N) range, and a drive (D) range (see Japanese Patent Application No. JP-A-H05-157164). In this apparatus, when the select lever is in the R range, three elements, which are the clutch C-2, the brake B-0, and the brake B-4, need to be engaged. Accordingly, even when the select lever is in the N range as a non-traveling range, the brake B-4 which does not participate in motive power transmission is turned to an engagement state in advance, and thereby an oil pressure is made to newly operate only on the clutch C-2 and the brake B-0 when the select lever is switched to the R range. In this manner, the apparatus is capable of suppressing delay in operation of clutches and brakes, that is, delay in response to a shift operation, without increasing the capacity of an oil pressure generation source.

SUMMARY

In the above-described type of transmission apparatus, it is conceivable that a dedicated linear solenoid is used to turn on or off a brake (or a clutch) which is engaged in the N range. However, the linear solenoid adjusts the pressure by draining a part of input operating oil while outputting the rest of the operating oil. This increases the flow rate consumed by the linear solenoid itself, and increases the flow rate required and consumed in the entire hydraulic circuit, which consequently leads to increase in capacity of the oil pressure generation source and increases energy consumption in the entire apparatus. Further, newly adding the linear solenoid enlarges the entire apparatus.

It is a main object of a transmission apparatus of the present invention and a vehicle having the same to suppress the energy consumption of the entire apparatus and to downsize the apparatus.

In the transmission apparatus of the present invention and the vehicle having the same, the following means are adopted to achieve at least a part of the above-described object.

A transmission apparatus according to a first aspect of the present invention, including an automatic transmission that is mounted in a vehicle and is capable of engaging a first engagement element and a second engagement element among a plurality of engagement elements when shift-operated to a reverse position, and engaging the first engagement element when shift-operated to a neutral position, includes: a pressure feeding unit adjusting a fluid pressure of a fluid pressure source and outputting the fluid pressure as a line pressure; a fluid pressure input/output unit receiving the line pressure and outputting from a reverse position output port among a plurality of output ports when shift-operated to a reverse position, and blocking the plurality of output ports when shift-operated to the neutral position; a first pressure regulating unit receiving and adjusting the line pressure and outputting a fluid pressure which is the line pressure adjusted; and a selective output unit outputting to the first engagement element the line pressure output from the reverse position output port and outputting to the second engagement element the fluid pressure output from the first pressure regulating unit when shift-operated to the reverse position, and outputting to the first engagement element the fluid pressure output from the first pressure regulating unit when shift-operated to the neutral position.

In the transmission apparatus according to the first aspect of the present invention, in the automatic transmission that is capable of engaging the first engagement element and the second engagement element among the plurality of engagement elements when shift-operated to the reverse position, and engaging the first engagement element when shift-operated to the neutral position, the fluid pressure input/output unit outputs the pressure from the reverse position output port among the plurality of output ports when shift-operated to the reverse position, and blocks the plurality of output ports when shift-operated to the neutral position. The first pressure regulating unit receives, adjusts and outputs the line the pressure. The selective output unit outputs to the first engagement element the fluid pressure output from the reverse position output port and outputs to the second engagement element the fluid pressure output from the first pressure regulating unit when shift-operated to the reverse position, and outputs to the first engagement element the fluid pressure output from the first pressure regulating unit when shift-operated to the neutral position. Thus, as compared to the case where the first engagement element and the second engagement element are engaged simultaneously when shift-operated to the reverse position, in the present invention, the fluid pressure is only supplied to the first engagement element, whereby it is possible to suppress a discharging capacity of a fluid pressure source such as a pump. Furthermore, in the pressure regulating unit such as a valve, generally, a small amount of operating fluid leaks constantly. Thus, when a dedicated pressure regulating unit is provided so as to engage the first engagement element when in the neutral position, the discharge capacity of the pressure feeding unit has to be increased by the amount of the operating fluid leaking from the pressure regulating unit. In the present invention, it is not necessary to separately provide the pressure regulating unit engaging the first engagement element when shift-operated to the neutral position. Consequently, energy consumption of the entire apparatus can be suppressed and fuel efficiency can be improved, and further, the transmission apparatus can be downsized.

In the transmission apparatus according to a second aspect of the present invention which is capable of, when shift-operated to a forward position, forming a shift speed for starting by engaging the first engagement element and a third engagement element among the plurality of engagement elements, and forming a shift speed other than the shift speed for starting by engaging at least a fourth engagement element among the plurality of engagement elements, the selective output unit may be a unit selectively outputting the fluid pressure output from the first pressure regulating means to the fourth engagement element or the first engagement element in the forward position when shift-operated to the forward position. Accordingly, the discharging capacity of the fluid pressure source can be suppressed also when switching from the neutral position to the forward position, and the fuel efficiency can be improved. Here, the fourth engagement element may be the second engagement element. In the transmission apparatus according to a third aspect of the present invention, the fourth engagement element may be an element capable of, when shift-operated to the forward position, forming a shift speed which does not involve direct switching to or from the shift speed for starting. In this case, after the fluid pressure of the engagement element, which is released using the first pressure regulating unit, is completely discharged, speed shifting that supplies the fluid pressure to the engagement element, which is engaged using the first pressure regulating unit, does not occur. Thus, shifting with a long shifting time can be eliminated.

Further, in the transmission apparatus according to a fourth aspect of the present invention, the first pressure regulating unit may be a unit adjusting the line pressure when shift-operated to the neutral position, in a low engagement pressure lower than an engagement pressure when the first engagement element is fully engaged. Accordingly, the fluid pressure can be discharged quickly from the first engagement element when shifting speed, and a time needed for shifting can be shortened. Particularly, this effect becomes more prominent when shifting from the shift speed for starting to another forward speed.

Furthermore, in the transmission apparatus according to a fifth aspect of the present invention, the selective output unit may be a unit including: a switching valve that has a first input port receiving the fluid pressure output from the first pressure regulating unit, a second input port receiving the line pressure output from the reverse position output port of the fluid pressure input/output unit, a first output port outputting the fluid pressure to the first engagement element, and a second output port outputting the fluid pressure to the second engagement element, and that selectively switches between a state that the fluid pressure input to the first input port is output from the first output port and a state that the fluid pressure input to the first input port is output from the second output port and the fluid pressure input to the second input port is output from the first output port; and a signal pressure output unit outputting a signal pressure for driving the switching valve. Accordingly, the state can be switched by one switching valve, and thus the fluid pressure circuit can be made compact. Moreover, when shift-operated from the reverse position to the forward position, the destination of output of the output pressure of the first pressure regulating unit can be switched from the second engagement element to the first engagement element by switching one switching valve. Therefore, a time needed for shifting when shift-operated from the reverse position to the forward position can be shortened.

In the transmission apparatus according to a sixth aspect of the present invention which is capable of, when shift-operated to a forward position, forming a shift speed for starting by engaging the first engagement element and a third engagement element among the plurality of engagement elements, and forming a shift speed other than the shift speed for starting by engaging at least a fourth engagement element among the plurality of engagement elements, the fluid pressure input/output unit may be for a unit receiving the line pressure and outputting from a forward position output port among the plurality of output ports when shift-operated to the forward position, the transmission apparatus may include a second pressure regulating unit receiving and adjusting the line pressure output from the forward position output port and outputting a fluid pressure which is the line pressure adjusted, and the selective output unit may be a unit selectively outputting the fluid pressure output from the second pressure regulating unit to the fourth engagement element or to the first engagement element in the forward position when shift-operated to the forward position. Accordingly, the discharging capacity of the fluid pressure source can be suppressed also when switching from the neutral position to the forward position, and the fuel efficiency can be improved. Furthermore, disengagement of the fourth engagement element and engagement of the third engagement element can be performed smoothly when changing from a shift speed other than the shift speed for starting to the shift speed for starting. In the transmission apparatus according to a seventh aspect of the present invention, the fourth engagement element may be an element capable of, when shift-operated to the forward position, forming a shift speed which does not involve direct switching to or from the shift speed for starting. In the case where the fourth engagement element is an engagement element forming a shift speed (low shift speed) that is switched directly to/from the shift speed for starting, when downshifting from the low shift speed to the shift speed for starting, it becomes necessary to switch the fluid pressure output from the second pressure regulating unit from the fourth engagement element to the first engagement element, which impairs smooth shifting. However, when shifting from a high shift speed to the shift speed for starting, considering shift shock and over-rev of the rotation speed of the internal combustion engine connected to the input shaft of the automatic transmission, shifting is generally made from the high shift speed to the shift speed for starting through an intermediate shift speed. Thus, switching the fluid pressure output from the second pressure regulating unit from the fourth engagement element to the first engagement element is not necessary, and the discharging capacity of the fluid pressure source when shifting from the forward position to the reverse position can be suppressed without impairing smooth shifting when traveling forward. Further, in the transmission apparatus according to an eight aspect of the present invention, the selective output unit may output the fluid pressure output from the first pressure regulating unit to the second engagement element when shift-operated to the forward position, and the second engagement element may be an element capable of, when shift-operated to the forward position, forming a shift speed which is other than the shift speed for starting and involves direct switching to or from the shift speed for starting. In this case, when shift-operated to the forward position, the fluid pressure output from the second pressure regulating unit is supplied to the first engagement element, and the fluid pressure output from the first pressure regulating unit is supplied to the second engagement element. Therefore, when directly switching from the shift speed formed by engaging the second engagement element to the shift speed for starting, it is possible to simultaneously supply the fluid pressure to the first engagement element and discharge the fluid pressure from the second engagement element, and thus the time required for shifting can be reduced. Furthermore, in the transmission apparatus according to ninth and tenth aspect of the present invention, the first pressure regulating unit may be a unit adjusting the line pressure when shift-operated to the neutral position, in a low engagement pressure lower than an engagement pressure when the first engagement element is fully engaged. Accordingly, the fluid pressure can be discharged from the first engagement element quickly when shifting speed, and the time needed for speed shifting can be reduced. Particularly, this effect becomes more prominent when shifting from the shift speed for starting to another forward speed.

Further, in the transmission apparatus according to an eleventh aspect of the present invention, the selective output unit may be a unit including: a first switching valve receiving the fluid pressure output from the first pressure regulating unit and selectively outputting the fluid pressure to a first output port or a second output port supplying the fluid pressure to the second engagement element; a second switching valve that has a first input port receiving the fluid pressure output from the first output port of the first switching valve and a second input port receiving the line pressure output from the reverse position output port of the fluid pressure input/output unit, and that selectively outputs the fluid pressure input to the first and second input ports to the first engagement element; and a signal pressure output unit outputting a signal pressure for driving the first and second switching.

Further, in the transmission apparatus according a twelfth aspect of the present invention that has the second pressure regulating unit and that forms a shift speed other than the shift speed for starting by engaging at least the fourth engagement element when shift-operated to a forward position, the selective output unit may be a unit including: a first switching valve receiving the fluid pressure output from the first pressure regulating unit and selectively outputting the fluid pressure to a first output port or to a second output port supplying the fluid pressure to the second engagement element; a second switching valve that has a first input port and a second input port receiving the line pressure output from the reverse position output port of the fluid pressure input/output unit, and that selectively inputs the fluid pressure through the first or second input port and outputs the fluid pressure to the first engagement element; a third switching valve that has a third input port receiving the fluid pressure output from the first output port of the first switching valve, a fourth input port receiving the fluid pressure output from the second pressure regulating unit, a third output port outputting the fluid pressure to the first input port of the second switching valve, and a fourth output port outputting the fluid pressure to the fourth engagement element, and that outputs the fluid pressure input to the fourth input port to the third output port or inputs the fluid pressure through the third input port and outputs the fluid pressure to the third output port, and inputs the fluid pressure through the fourth input port and outputs the fluid pressure to the fourth engagement element; and a signal pressure output unit outputting a signal pressure for driving the first to third switching valves A vehicle according to a thirteenth aspect of the present invention has the transmission apparatus according to one of the above-described aspects of the present invention, that is, basically, a transmission apparatus having an automatic transmission that is mounted in a vehicle and is capable of engaging a first engagement element and a second engagement element among a plurality of engagement elements when shift-operated to a reverse position, and engaging the first engagement element when shift-operated to a neutral position. The transmission apparatus includes: a pressure feeding unit adjusting a fluid pressure of a fluid pressure source and outputting the fluid pressure as a line pressure; a fluid pressure input/output unit receiving the line pressure from a reverse position output port among a plurality of output ports and outputting the line pressure when shift-operated to the reverse position, and blocking the plurality of output ports when shift-operated to the neutral position; and first pressure regulating unit receiving, adjusting, and outputting the line pressure; and a selective output unit outputting to the first engagement element the fluid pressure; and a selective output unit outputting to the first engagement element the fluid pressure output from the reverse position output port and outputting to the second engagement element the fluid pressure output from the first pressure regulating unit when shift-operated to the reverse position, and outputting to the first engagement element the fluid pressure output from the first pressure regulating unit when shift-operated to the neutral position.

In the vehicle of the present invention, since the transmission apparatus according to one of the above-described aspects of the present invention is mounted, the effects achieved by the transmission apparatus of the present invention, such as effects of suppressing energy consumption of the entire apparatus and downsizing the apparatus, can be achieved.

BRIEF DESCRIPTION OF THE DRAWINGS

FIG. 2 is an explanatory diagram showing an example of an operation table of an automatic transmission 20.

FIG. 7 is a time chart when the shift lever 91 is changed between a D position and the R position.

DETAILED DESCRIPTION OF EMBODIMENTS

Now, embodiments of the present invention will be described.

Figure 1:
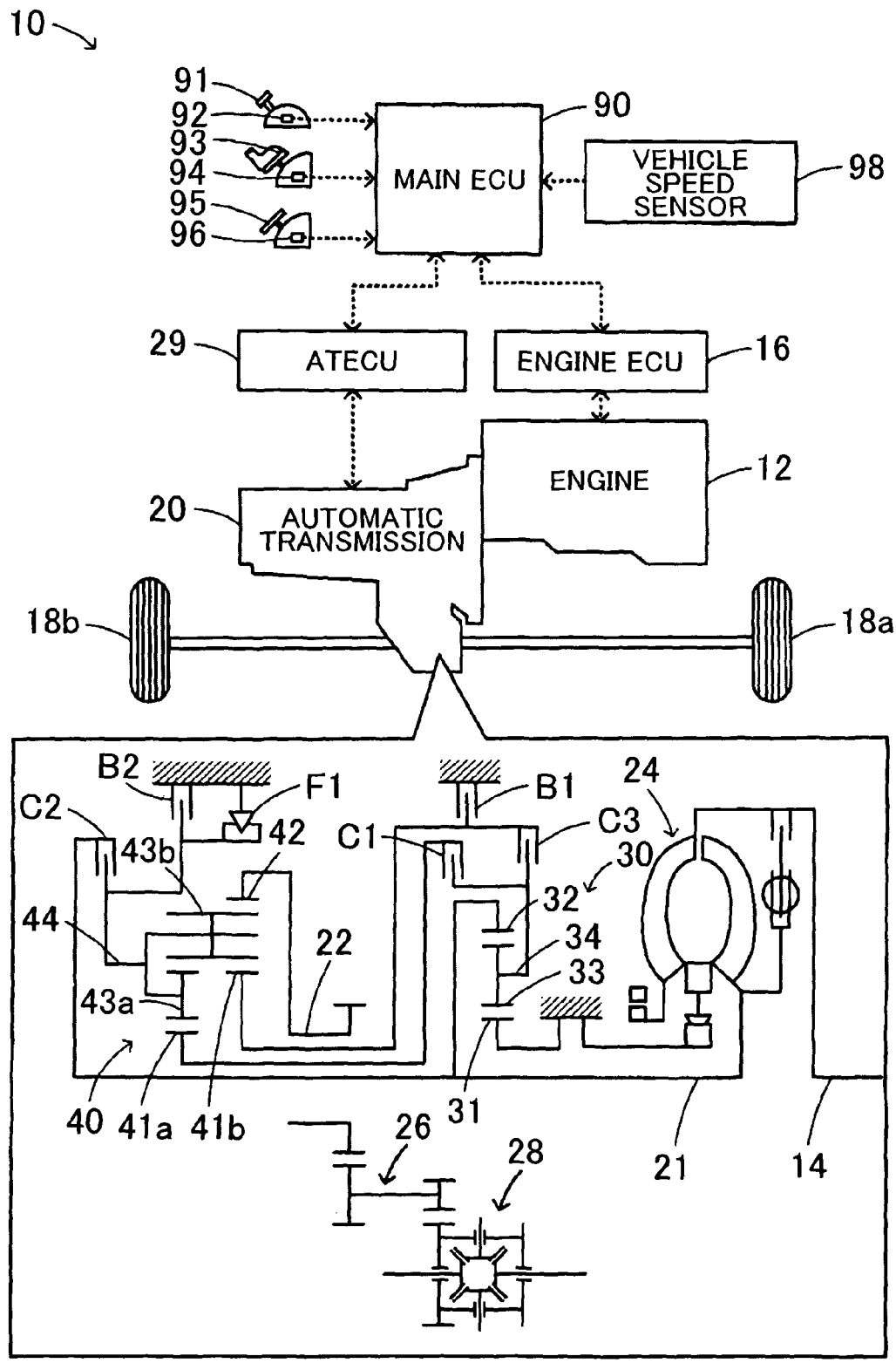
FIG. 1 is a schematic diagram showing an overview of the structure of an automobile 10 having a transmission apparatus as one embodiment of the present invention.
Figure 3:
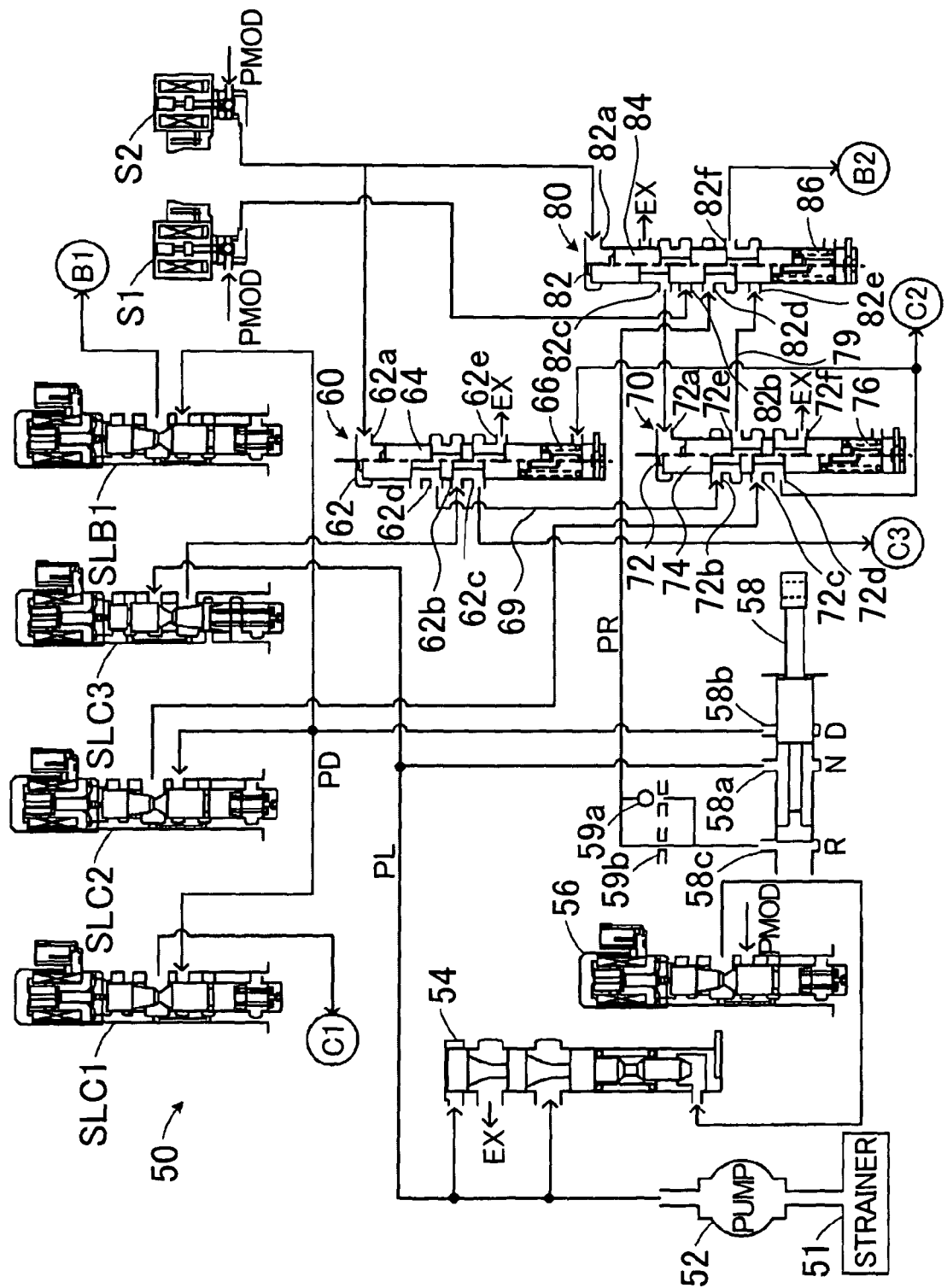
FIG. 3 is a structural diagram showing an overview of the structure of a hydraulic circuit 50 of the automatic transmission 20.

FIG. 1 is a structural diagram showing an overview of the structure of an automobile 10 having a transmission apparatus according to one embodiment of the present invention. FIG. 2 shows an operation table of an automatic transmission 20. FIG. 3 is a structural diagram showing an overview of the structure of a hydraulic circuit 50 of the automatic transmission 20. As shown in FIG. 1, the automobile 10 of the embodiment has an engine 12 as an internal combustion engine outputting motive power by explosive combustion of hydrocarbon fuel such as gasoline and diesel oil, a torque converter 24 with a lock-up clutch attached to a crankshaft 14 of the engine 12, the multi-speed automatic transmission 20 that includes an input shaft 21 connected to an output side of the torque converter 24 and an output shaft 22 connected to driving wheels 18a, 18b via a gear mechanism 26 and a differential gear 28, and that shifts the motive power input to the input shaft 21 and transmits the shifted motive power to the output shaft 22, and a main electronic control unit (hereinafter also referred to as a main ECU) 90 controlling the entire vehicle.

The engine 12 is operation-controlled by an engine electronic control unit (hereinafter also referred to as an engine ECU) 16. Although not shown in detail, the engine ECU 16 is structured as a microprocessor with a CPU as a main component, and has a ROM storing control programs, a RAM temporarily storing data, an input-output port, and a communication port besides the CPU. To this engine ECU 16, signals from various sensors needed for operation-controlling the engine 12, such as a rotation speed sensor attached to the crankshaft 14, are input via an input port, and from the engine ECU 16, a drive signal to a throttle motor adjusting a throttle opening, a control signal to a fuel injection valve, an ignition signal to spark plugs, and so on are output via an output port. The engine ECU 16 communicates with the main ECU 90, controls the engine 12 by a control signal from the main ECU 90, and outputs data related to the operation state of the engine 12 to the main ECU 90 as necessary.

The automatic transmission 20 is structured as a multi-speed transmission with six speeds, and has a single pinion type planetary gear mechanism 30, a Ravigneaux type planetary gear mechanism 40, three clutches C1, C2, C3, two brakes B1, B2, and a one-way clutch F1. The single pinion type planetary gear mechanism 30 has a sun gear 31 as an external gear, a ring gear 32 as an internal gear arranged concentrically with the sun gear 31, a plurality of pinion gears 33 meshing with the sun gear 31 and with the ring gear 32, and a carrier 34 rotatably and revolvably holding the plurality of pinion gears 33. The sun gear 31 is fixed to the case, and the ring gear 32 is connected to the input shaft 21. The Ravigneaux type planetary gear mechanism 40 has two sun gears 41$a$, 41$b$ as external gears, a ring gear 42 as an internal gear, a plurality of short pinion gears 43$a$ meshing with the sun gear 41$a$, a plurality of long pinion gears 43$b$ meshing with the sun gear 41$b$ and the plurality of short pinion gears 43$a$ and with the ring gear 42, and a carrier 44 coupling the plurality of short pinion gears 43$a$ and the plurality of long pinion gears 43$b$ and holding the short pinion gears 43$a$ and the long pinion gears 43$b$ rotatably and revolvably. The sun gear 41$a$ is connected to the carrier 34 of the single pinion type planetary gear mechanism 30 via the clutch C1. The sun gear 41$b$ is connected to the carrier 34 via the clutch C3 and to a case via the brake B1. The ring gear 42 is connected to the output shaft 22. The carrier 44 is connected to the input shaft 21 via the clutch C2. Further, the carrier 44 is connected to the case via the brake B2, and to the case via the one-way clutch F1.

In the automatic transmission 20 thus structured, it is possible to switch among first to sixth forward speeds, a reverse speed, and a neutral, by combinations of turning on and off of the clutches C1 to C3 (hereinafter, turning on refers to engagement and turning off refers to disengagement) and turning on and off of the brakes B1, B2, as shown in the operation table of FIG. 2.

A state of the first forward speed can be formed by turning on the clutch C1 and turning off the clutches C2, C3 and the brakes B1, B2, or by turning on the clutch C1 and the brake B2 and turning off the clutches C2, C3 and the brake B1. In this state, motive power input to the ring gear 32 of the single pinion type planetary gear mechanism 30 from the input shaft 21 is decelerated by receiving a reaction force on the sun gear 31 side by fixing the sun gear 31, and is transmitted to the sun gear 41$a$ of the Ravigneaux type planetary gear mechanism 40 via the carrier 34 and the clutch C1. Motive power input to the sun gear 41$a$ is decelerated by receiving a reaction force on the carrier 44 side by fixing the carrier 44 by the one-way clutch F1, and is output to the output shaft 22 via the ring gear 42. Thus, motive power input to the input shaft 21 is decelerated with a relatively large speed reduction ratio and output to the output shaft 22. In the state of first forward speed, during engine braking, the carrier 44 is fixed instead of the one-way clutch F1 by turning on the brake B2. A state of the second forward speed can be formed by turning on the clutch C1 and the brake B1 and turning off the clutches C2, C3 and the brake B2. In this state, motive power input to the ring gear 32 of the single pinion type planetary gear mechanism 30 from the input shaft 21 is decelerated by receiving a reaction force on the sun gear 31 side by fixing the sun gear 31, and is transmitted to the sun gear 41$a$ of the Ravigneaux type planetary gear mechanism 40 via the carrier 34 and the clutch C1. Motive power input to the sun gear 41$a$ is decelerated by receiving a reaction force on the sun gear 41$b$ side by fixing the sun gear 41$b$ by the brake B1, and is output to the output shaft 22 via the ring gear 42. Thus, motive power input to the input shaft 21 is decelerated with a smaller speed reduction ratio than that of the first forward speed and output to the output shaft 22. A state of the third forward speed can be formed by turning on the clutches C1, C3 and turning off the clutch C2 and the brakes B1, B2. In this state, motive power input to the ring gear 32 of the single pinion type planetary gear mechanism 30 from the input shaft 21 is decelerated by receiving a reaction force on the sun gear 31 side by fixing the sun gear 31, and is transmitted to the sun gear 41$a$ of the Ravigneaux type planetary gear mechanism 40 via the carrier 34 and the clutch C1. Motive power input to the sun gear 41$a$ is output at equal speed to the output shaft 22 via the ring gear 42 by integral rotation of the Ravigneaux type planetary gear mechanism 40 by turning on of the clutch C1 and the clutch C3. Thus, motive power input to the input shaft 21 is decelerated with a smaller speed reduction ratio than that of the second forward speed and output to the output shaft 22. A state of the fourth forward speed can be formed by turning on the clutches C1, C2 and turning off the clutch C3 and the brakes B1, B2. In this state, motive power input to the ring gear 32 of the single pinion type planetary gear mechanism 30 from the input shaft 21 is decelerated by receiving a reaction force on the sun gear 31 side by fixing the sun gear 31 is transmitted to the sun gear 41$a$ of the Ravigneaux type planetary gear mechanism 40 via the carrier 34 and the clutch C1. The motive power is also transmitted to the carrier 44 of the Ravigneaux type planetary gear mechanism 40 directly from the input shaft 21 via the clutch C2, thereby determining a drive state of the ring gear 42, that is, the output shaft 22. Thus, motive power input to the input shaft 21 is decelerated with a smaller speed reduction ratio than that of the third forward speed and output to the output shaft 22. A state of the fifth forward speed can be formed by turning on the clutches C2, C3 and turning off the clutch C1 and the brakes B1, B2. In this state, motive power input to the ring gear 32 of the single pinion type planetary gear mechanism 30 from the input shaft 21 is decelerated by receiving a reaction force on the sun gear 31 side by fixing the sun gear 31, and is transmitted to the sun gear 41$b$ of the Ravigneaux type planetary gear mechanism 40 via the carrier 34 and the clutch C1. The motive power is also transmitted to the carrier 44 of the Ravigneaux type planetary gear mechanism 40 directly from the input shaft 21 via the clutch C2, thereby determining a drive state of the ring gear 42, that is, the output shaft 22. Thus, motive power input to the input shaft 21 is accelerated and output to the output shaft 22. A state of the sixth forward speed can be formed by turning on the clutch C2 and the brake B1, and turning off the clutches C1, C3 and the brake B2. In this state, motive power input to the carrier 44 of the Ravigneaux type planetary gear mechanism 40 from the input shaft 21 via the clutch C2 is accelerated by receiving a reaction force on the sun gear 41b side by fixing the sun gear 41b by the brake B1, and is output to the output shaft 22 via the ring gear 42. Thus, motive power input to the input shaft 21 is accelerated with a smaller speed reduction ratio than that of the fifth forward speed and output to the output shaft 22.

A state of a first reverse speed can be formed by turning on the clutch C3 and the brake B2 and turning off the clutches C1, C2 and the brake B1. In this state, motive power input to the ring gear 32 of the single pinion type planetary gear mechanism 30 from the input shaft 21 is decelerated by receiving a reaction force on the sun gear 31 side by fixing the sun gear 31, and is transmitted to the sun gear 41b of the Ravigneaux type planetary gear mechanism 40 via the carrier 34 and the clutch C3. Motive power input to the sun gear 41b is rotated in reverse by receiving a reaction force on the carrier 44 side by fixing the carrier 44 by the brake B2 and output to the output shaft 22 via the ring gear 42. Thus, motive power input to the input shaft 21 is decelerated with a relatively small speed reduction ratio and output to the output shaft 22 as a motive power of reverse rotation.

A state of neutral may be formed by turning on the brake B2 and turning off the clutches C1 to C3 and the brake B1, or by turning off all of the clutches C1 to C3 and the brakes B1, B2. In this embodiment, the state of neutral is formed by the former. The reason for doing so will be described later.

The clutches C1 to C3 and the brakes B1, B2 of the automatic transmission 20 are driven by the hydraulic circuit 50 of FIG. 3. This hydraulic circuit 50 is structured from, as shown in the diagram, a mechanical oil pump 52, a regulator valve 54, a linear solenoid 56, a manual valve 58, a normal close type linear solenoid SLC1, a normal close type linear solenoid SLC2, a normal open type linear solenoid SLC3, a normal close type linear solenoid SLB1, a C3 relay valve 60, a C2 relay valve 70, a B2 relay valve 80, a normal open type on-off solenoid S1, a normal close type on-off solenoid S2, and so on. The mechanical oil pump 52 sucks operating oil from a strainer 51 and pressure feeds the oil using motive power from the engine 12, and the regulator valve 54 adjusts the pressure of operating oil (line pressure PL) pressure fed by the mechanical oil pump 52. The linear solenoid 56 drives the regulator valve 54 using a modulator pressure PMOD input via a not-shown modulator valve from the line pressure PL. The manual valve 58 includes an input port 58a receiving the line pressure PL, a D position output port 58b, and an R position output port 58c. In conjunction with an operation of a shift lever 91, the manual valve 58 blocks communication between the input port 58a and both the output ports 58b, 58c when the shift lever 91 is in the neutral (N) position, and allows communication between the input port 58a and the D position output port 58b and blocks communication between the input port 58a and the R position output port 58c when the shift lever 91 is in the drive (D) position. When the shift lever 91 is in the reverse (R) position, the manual valve 58 blocks communication between the input port 58a and the D position output port 58b and allows communication between the input port 58a and the R position output port 58c. The linear solenoid SLC1 receives the line pressure PL and adjusts and outputs the line pressure to the clutch C1. The linear solenoid SLC2 receives a drive pressure PD from the D position output port 58b of the manual valve 58, and adjusts and outputs the drive pressure. The linear solenoid SLC3 receives the line pressure PL, and adjusts and outputs the line pressure PL. The linear solenoid SLB1 receives the drive pressure PD from the D position output port 58b of the manual valve 58, and adjusts and outputs the drive pressure PD to the brake B1. The C3 relay valve 60 receives an SLC3 pressure that is an output pressure from the linear solenoid SLC3 and selectively outputs the pressure to the clutch C3 or the other oil passage 69. The C2 relay valve 70 receives an output pressure from the C3 relay valve 60 via the other oil passage 69 and selectively outputs the output pressure to the clutch C2 or the other oil passage 79. Further, the C2 relay valve 70 receives an SLC2 pressure that is an output pressure from the linear solenoid SLC2, and outputs the SLC2 pressure to the oil passage 79 when outputting the output pressure of the C3 relay valve 60 to the clutch C2, and blocks the SLC2 pressure when outputting the output pressure of the C3 relay valve 60 to the oil passage 79. The B2 relay valve 80 selectively receives an output pressure from the C2 relay valve 70 output to the oil passage 79 and a reverse pressure PR output from the R position output port 58c of the manual valve 58, and outputs the selected pressure to the brake B2. The on-off solenoid S1 outputs a signal pressure for driving to the C2 relay valve 70 using a modulator pressure PMOD input via a modulator valve from the line pressure PL. The on-off solenoid S2 outputs a signal pressure for driving to the C3 relay valve 60 and the B2 relay valve 80 using the modulator pressure PMOD input via the modulator valve from the line pressure PL. The oil passage between the R position output port 58c of the manual valve 58 and the input port 82d of the B2 relay valve 80 is provided with a check valve 59a in a direction toward the B2 relay valve 80 side, and is provided with an orifice 59b in parallel with the check valve 59a. Here, the line pressure is an oil pressure needed in the automatic transmission. This oil pressure needed in the automatic transmission is calculated from the state (in shifting or not) of the automatic transmission 20, torque output from the engine 12, vehicle speed, throttle opening, temperature of operating oil (oil temperature), and so on.

The C3 relay valve 60 is structured from a sleeve 62 in which a signal pressure input port 62a receiving the signal pressure from the on-off solenoid S2, an input port 62b receiving the output pressure (SLC3 pressure) from the linear solenoid SLC3, an output port 62c outputting an oil pressure to the clutch C3, an output port 62d outputting an oil pressure to the oil passage 69, and a drain port 62e are formed, a spool 64 sliding in the sleeve 62 in an axial direction, and a spring 66 biasing the spool 64 in the axial direction. In this C3 relay valve 60, when the signal pressure is not input from the on-off solenoid S2 to the signal pressure input port 62a, the spool 64 moves to a position shown in a left-half region in the diagram by the biasing force of the spring 66, thereby allowing communication between the input port 62b and the output port 62c (the clutch C3 side) and blocking communication between the input port 62b and the output port 62d (the C2 relay valve 70 side). When the signal pressure is input to the signal pressure input port 62a from the on-off solenoid S2, this signal pressure overcomes the biasing force of the spring 66 and the spool 64 moves to a position shown in a right-half region in the diagram, thereby blocking communication between the input port 62b and the output port 62c (the clutch C3 side) and allowing communication between the input port 62b and the output port 62d (the C2 relay valve 70 side). When the communication between the input port 62b and the output port 62c (the clutch C3 side) is blocked, the output port 62c and the drain port 62e communicate with each other accompanying this, and operating oil on the clutch C3 side is drained.

The C2 relay valve 70 is structured from a sleeve 72 in which a signal pressure input port 72a receiving the signal pressure from the on-off solenoid S1, an input port 72b receiving the output pressure output from the C3 relay valve 60 to the oil passage 69, an input port 72c receiving the output pressure (SLC2 pressure) from the linear solenoid SLC2, an output port 72d outputting an oil pressure to the clutch C2, an output port 72e outputting an oil pressure to the oil passage 79, and a drain port 72f are formed, a spool 74 sliding in the sleeve 72 in an axial direction, and a spring 76 biasing the spool 74 in the axial direction. In this C2 relay valve 70, when the signal pressure is not input from the on-off solenoid S1 to the signal pressure input port 72a, the spool 74 moves to a position shown in a left-half region in the diagram by the biasing force of the spring 76, thereby allowing communication between the input port 72b (the C3 relay valve 60 side) and the output port 72e (the B2 relay valve 80 side), and allowing communication between the input port 72c (the linear solenoid SLC2 side) and the output port 72d (the clutch C2 side). When the signal pressure is input to the signal pressure input port 72a from the on-off solenoid S1, this signal pressure overcomes the biasing force of the spring 76, and the spool 76 moves to a position shown in a right-half region in the diagram, thereby blocking the input port 72b (the C2 relay valve 60 side), allowing communication between the input port 72c (the linear solenoid SLC2 side) and the output port 72e (the B2 relay valve 80 side), and blocking communication between the input port 72c and the output port 72d (the clutch C2 side). When the communication between the input port 72c and the output port 72d (the clutch C2 side) is blocked, the output port 72d and the drain port 72f communicate with each other accompanying this, and operating oil on the clutch C2 side is drained.

The B2 relay valve 80 is structured from a sleeve 82 in which a signal pressure input port 82a receiving the signal pressure from the on-off solenoid S2, a signal pressure input port 82b and a signal pressure output port 82c for outputting the signal pressure from the on-off solenoid S1 to the signal pressure input port 72a of the C2 relay valve 70 via the B2 relay valve 80, an input port 82d receiving a reverse pressure PR from the R position output port 58c of the manual valve 58, an input port 82e receiving an output pressure from the output port 72e of the C2 relay valve 70, and an output port 82f outputting an oil pressure to the brake B2 are formed, a spool 84 sliding in the sleeve 82 in an axial direction, and a spring 86 biasing the spool 84 in the axial direction. In this B2 relay valve 80, when the signal pressure is not input to the signal pressure input port 82a from the on-off solenoid S1, the spool 84 moves to a position shown in a left-half region in the diagram by the biasing force of the spring 86, thereby blocking the signal pressure input port 82b to turn off the signal pressure to the signal pressure input port 72a of the C2 relay valve 70, allowing communication between the input port 82d (the side of the R position output port 58c of the manual valve 58) and the output port 82f (the brake B2 side), and blocking the input port 82e (the C2 relay valve 70 side). When the signal pressure is input to the signal pressure input port 82a from the on-off solenoid S2, this signal pressure overcomes the biasing force of the spring 86, and the spool 86 moves to a position shown in a right-half region in the diagram, thereby allowing communication between the S1 signal pressure input port 82b and the S1 signal pressure output port 82c to form a state that the signal pressure from the on-off solenoid S1 can be output to the signal pressure input port 72a of the C2 relay valve 70 via the signal pressure input port 82b and the signal pressure output port 82c, blocking the input port 82d (the side of the R position output port 58c of the manual valve 58), and allowing communication between the input port 82e (the C2 relay valve 70 side) and the output port 82f (the clutch C3 side).

The automatic transmission 20 (the hydraulic circuit 50) is drive-controlled by an automatic transmission electronic control unit (hereinafter referred to as an ATECU) 29. The ATECU 29 is formed as, although not shown in detail, a microprocessor with a CPU as a main component, and has a ROM storing processing programs, a RAM temporarily storing data, an input/output port, and a communication port, besides the CPU. To the ATECU 29, an input shaft rotation speed Nin from a rotation speed sensor attached to the input shaft 21, an output shaft rotation speed Nout from a rotation speed sensor attached to the output shaft 22, and the like are input via an input port. From the ATECU 29, drive signals to the linear solenoids 56, SCL1 to SLC3, SLB1, drive signals to the on-off solenoids S1, S2, and so on are output via an output port. The ATECU 29 communicates with the main ECU 90, controls the automatic transmission 20 (the hydraulic circuit 50) by a control signal from the main ECU 90, and outputs data related to the state of the automatic transmission 20 to the main ECU 90 as necessary.

The main ECU 90 is formed as, although not shown in detail, a microprocessor with a CPU as a main component, and has a ROM storing processing programs, a RAM temporarily storing data, an input/output port, and a communication port, besides the CPU. To the main ECU 90, a shift position SP from a shift position sensor 92 detecting an operation position of the shift lever 91, an accelerator opening Acc from an accelerator pedal position sensor 94 detecting a depression amount of an accelerator pedal 93, a brake switch signal BSW from a brake switch 96 detecting depression of a brake pedal 95, a vehicle speed V from a vehicle speed sensor 98, and so on are input via an input port. Here, the shift lever 91 in the embodiment can select among a parking (P) position, a reverse (R) position, a neutral (N) position, and a drive (D) position, and the clutches C1 to C3 and the brake B1, B2 are turned on and off according to the selected position. As described above, the main ECU 90 is connected to the engine ECU 16 and the ATECU 29 via the communication port, and exchanges various control signals and data with the engine ECU 16 and the ATECU 29.

In the automobile 10 thus structured, when the shift lever 91 is shift-operated to the D position, one of the first forward speed to the sixth forward speed is set using a shift map based on the accelerator opening ACC and the vehicle speed V, and the linear solenoids 56, SLC1 to SLC3, SLB1 and the on-off solenoids S1, S2 are drive-controlled so that necessary clutches and brakes among the clutches C1 to C3 and the brakes B1, B2 are turned on according to the set shift speed.

Here, the automatic transmission 20 and the ATECU 29 correspond to the transmission apparatus of the embodiment.

Figure 4:
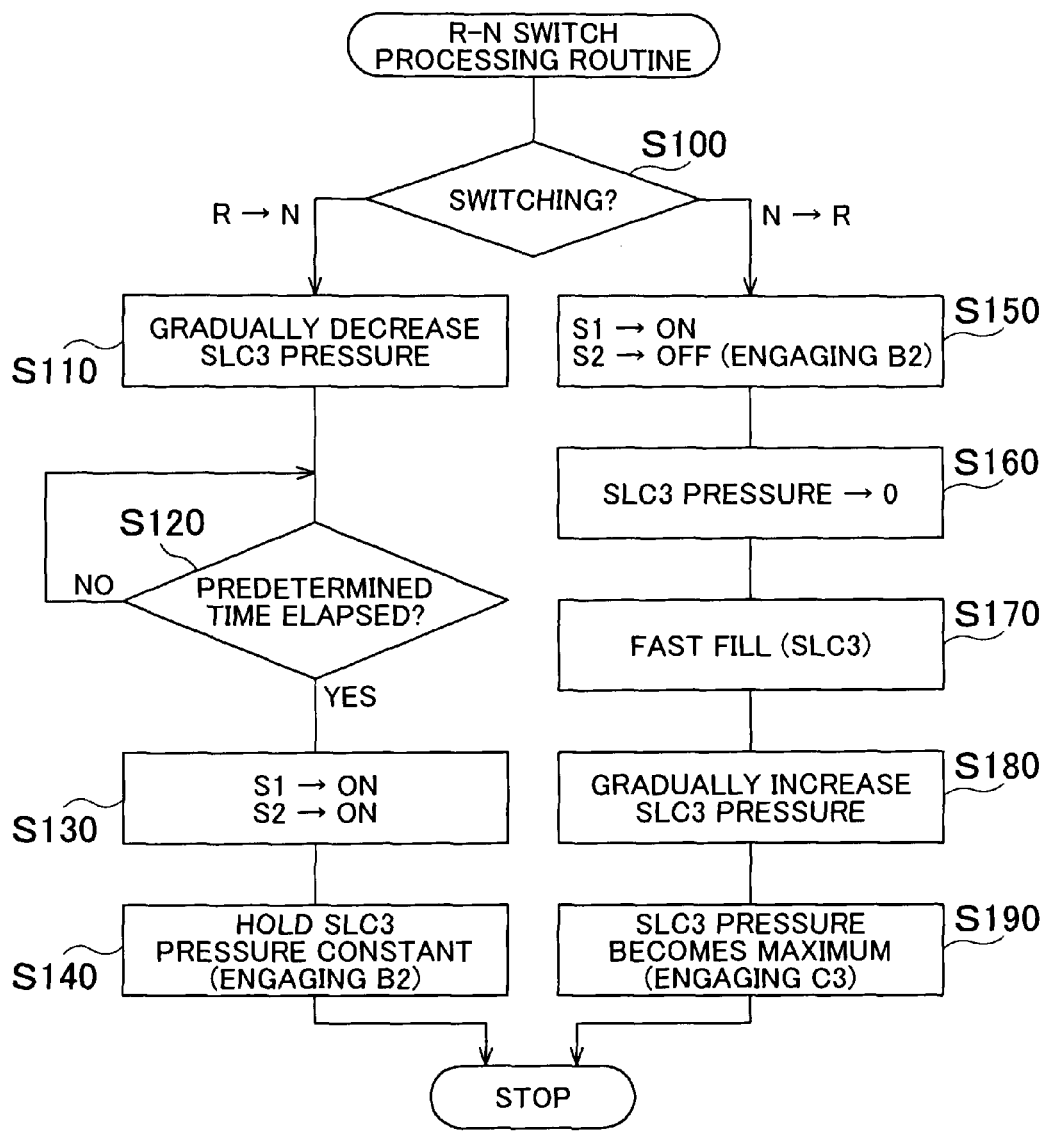
FIG. 4 is a flowchart showing an example of an R-N switch processing routine executed by an ATECU 29.
Figure 5:
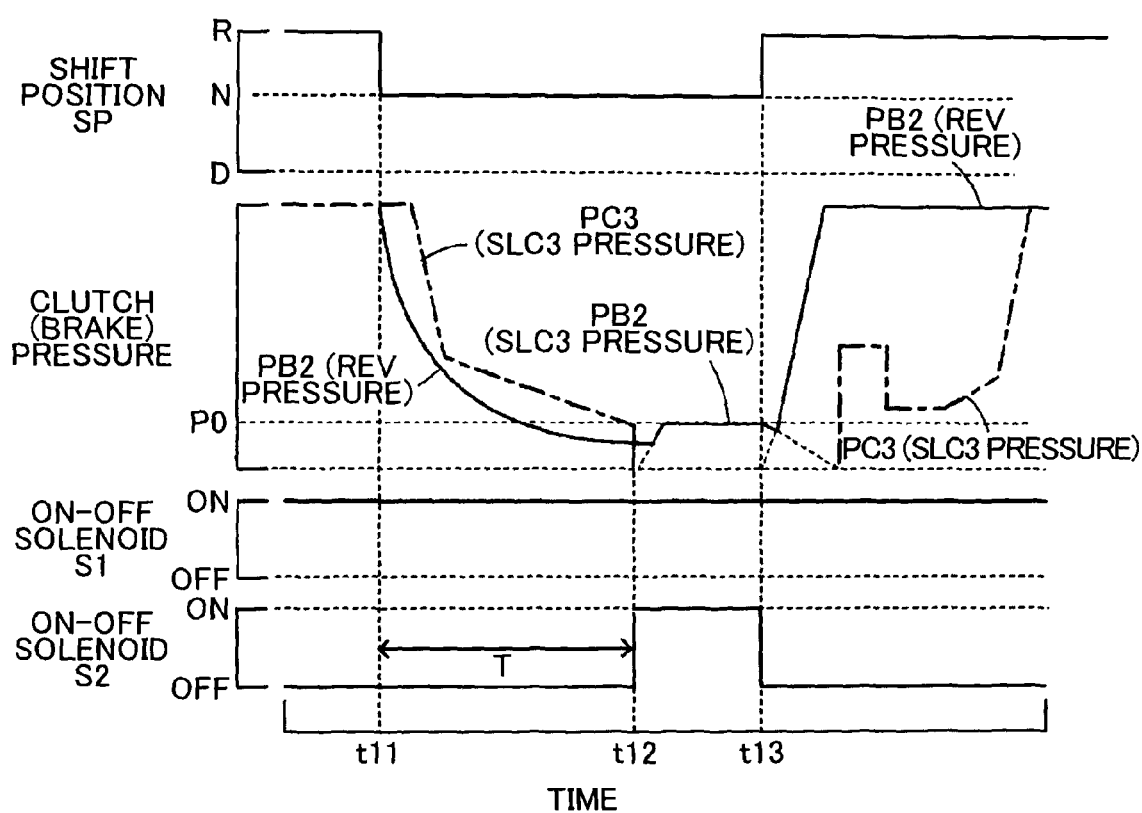
FIG. 5 is a time chart when a shift lever 91 is changed between an R position and an N position.

Next, operation of the transmission apparatus of the embodiment included in the thus structured automobile 10, particularly, operation when the shift lever 91 is changed between the N position and the R position and operation when the shift lever 91 is changed between the D position and the R position will be described. First, the operation when the shift lever 91 is changed between the N position and the R position will be described. FIG. 4 is a flowchart showing an example of an R-N switch processing routine executed by the ATECU 29. This routine is executed when the shift lever 91 is switched from the R position to the N position or switched from the N position to the R position. When the shift lever 91 is switched from the R position to the N position, processing is performed in which a state that the clutch C3 and the brake B2 are on is switched to a state that only the brake B2 is on. When the shift lever 91 is switched from the N position to the R position, processing is performed in which a state that only the brake B2 is on is switched to a state that the clutch C3 and the brake B2 are on. In the following, the routine in FIG. 4 will be described with reference to a time chart illustrated in FIG. 5.

When the R-N switch processing routine is executed, the CPU of the ATECU 29 first determines whether the shift lever 91 is switched from the R position to the N position or from the N position to the R position (step S100). When the shift lever 91 is switched from the R position to the N position (time t11 in FIG. 5), the linear solenoid SLC3 is drive-controlled so that the SLC3 pressure as the output pressure from the linear solenoid SLC3 decreases gradually (step S110). Accordingly, a clutch pressure PC3 acting on the clutch C3 becomes small gradually, and engagement of the clutch C3 is released (see times t11 to t12 in FIG. 5). Further, when the shift lever 91 is switched from the R position to the N position, communication between the input port 58a receiving the line pressure PL of the manual valve 58 and the R position output port 58c is blocked, and operating oil on the brake B2 side is drained via the orifice 59b. Thus, a brake pressure PB2 acting on the brake B2 by the reverse pressure PR gradually becomes close to the value 0 (see times t11 to t12 in FIG. 5). Subsequently, upon elapsing of a predetermined time T (time t12 in FIG. 5) by which the SLC3 pressure approximates to a predetermined pressure P0 after the shift lever 91 is switched from the R position to the N position (step S120), both of the on-off solenoid S1 and the on-off solenoid S2 are turned on (step S130), the linear solenoid SLC3 is drive-controlled so that the SLC3 pressure is held constant at the predetermined pressure P0 (step S140), and this routine is finished. As described above, the on-off solenoid S1 is structured as a normal open type solenoid, and the on-off solenoid S2 is structured as a normal close type solenoid. Therefore, when both the on-off solenoids S1, S2 are turned on, the on-off solenoid S1 no longer outputs the signal pressure, and the on-off solenoid S2 outputs the signal pressure. This results in that a state that the SLC3 pressure from the linear solenoid SLC3 is supplied to the clutch C3 side to a state that the SLC3 pressure from the linear solenoid SLC3 is supplied to the brake B2 side via the C3 relay valve 60, the C2 relay valve 70, and the B2 relay valve 80 in order. In the embodiment, after the on-off solenoid S1 and the on-off solenoid S2 are both turned on, the linear solenoid SLC3 is drive-controlled so that the SLC3 pressure is held constant at the predetermined pressure P0, resulting in that the predetermined pressure P0 acts on the brake B2 to engage the brake B2. Here, the predetermined pressure P0 in the embodiment is set to the oil pressure to a degree that a piston of the brake B2 comes in contact with a friction plate. When the shift lever 91 is in the N position, it is not necessary to fully engage the brake B2. Thus, engaging the brake B2 by the predetermined pressure P0, which is the minimum required pressure, enables suppression of energy consumption.

On the other hand, when the shift lever 91 is switched from the N position to the R position (time t13 in FIG. 5), the on-off solenoid S1 is turned on and the on-off solenoid S2 is turned off (step S150), and the linear solenoid SLC3 is drive-controlled so that the SLC3 pressure of the linear solenoid SLC3 becomes the value 0 (step S160). When the on-off solenoid S1 is turned on and the on-off solenoid S2 is turned off, both the on-off solenoids 51, S2 no longer output the signal pressure. Thus, the SLC3 pressure of the linear solenoid SLC3 is supplied to the clutch C3 side, and the reverse pressure PR from the R position output port 58c of the manual valve 58 is supplied to the brake B2 side. Further, when the shift lever 91 is operated to the R position, the input port 58a of the manual valve 58 to which the line pressure PL is input and the R position output port 58c communicate with each other, resulting in that the line pressure PL acts on the brake B2 via the input port 58a and the R position output port 58c of the manual valve 58 to engage the brake B2. Then a fast fill for quickly filling operating oil is performed to fill a pack clearance of the clutch C3 (step S170). The SLC3 pressure increases gradually after the fast fill is completed (step S180), the linear solenoid SLC3 is drive-controlled so that the SLC3 pressure becomes maximum accompanying engagement of the clutch C3 (step S190), and this routine is finished. Thus, the clutch C3 is engaged and the R position is formed. In this manner, when the shift lever 91 is in the R position, the brake B2 is engaged by the oil pressure PR from the R position output port 58c of the manual valve 58, and the clutch C3 is engaged by the SLC3 pressure from the linear solenoid SLC3. When the shift lever 91 is in the N position, the brake B2 is engaged by supplying the SLC3 pressure from the linear solenoid SLC3 to the brake B2 instead of the clutch C3. Thus, it is possible to eliminate the need for providing a dedicated linear solenoid for engaging the brake B2.

Figure 6:
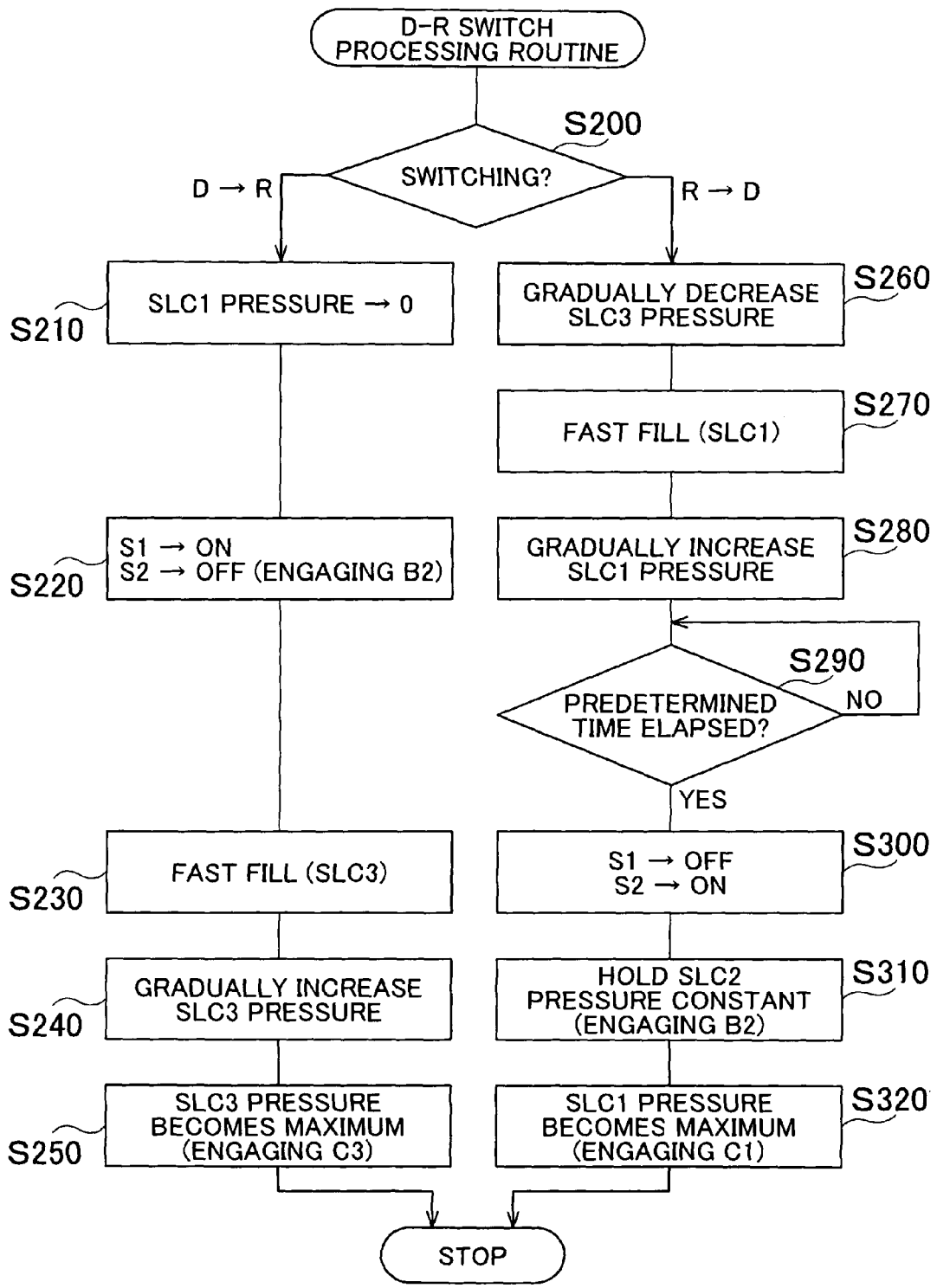
FIG. 6 is a flowchart showing an example of a D-R switch processing routine executed by the ATECU 29.

Next, the operation when the shift lever 91 is changed between the D position and the R position will be described. FIG. 6 is a flowchart showing an example of a D-R switch processing routine executed by the ATECU 29. This routine is executed when the shift lever 91 is switched from the D position to the R position or from the R position to the D position. When the shift lever 91 is switched from the D position to the R position, processing is performed in which a state that the clutch C1 and the brake B2 are on is switched to a state that only the brake B2 is on. When the shift lever 91 is switched from the R position to the D position, processing is performed so as to form a state of no engine braking with the first forward speed, that is, a state that only the brake B2 is on is switched to a state that the clutch C1 and the brake B2 are on. In the following, the routine in FIG. 6 will be described with reference to a time chart illustrated in FIG. 7.

When the D-R switch processing routine is executed, the CPU of the ATECU 29 first determines whether the shift lever 91 is switched from the D position to the R position or from the R position to the D position (step S200). When the shift lever 91 is switched from the D position to the R position (time t21 in FIG. 7), the linear solenoid SLC1 is drive-controlled so that the SLC1 pressure as the output pressure from the linear solenoid SLC1 becomes the value 0 so as to release engagement of the clutch C1 (step S210). The on-off solenoid S1 is turned on, and the on-off solenoid S2 is turned off (step S220). Thus, since both the on-off solenoids S1, S2 no longer output the signal pressure, the SLC3 pressure of the linear solenoid SLC3 is supplied to the clutch C3 side, and the oil pressure PR from the R position output port 58c of the manual valve 58 is supplied to the brake B2 side. This results in that the line pressure PL acts as the reverse pressure PR on the brake B2 via the input port 58a and the R position output port 58c of the manual valve 58 to thereby engage the brake B2. Then the aforementioned fast fill is performed for the clutch C3 (step S230). The SLC3 pressure of the linear solenoid SLC3 is increased gradually (S240), the linear solenoid SLC3 is drive-controlled so that the SLC3 pressure becomes maximum accompanying engagement of the clutch C3 (step S250), and this routine is finished.

On the other hand, when the shift lever 91 is switched from the R position to the D position (time t22 in FIG. 7), the linear solenoid SLC3 is drive-controlled so that the SLC3 pressure of the linear solenoid SLC3 decreases gradually (step S260). Accordingly, the clutch pressure PC3 acting on the clutch C3 decreases gradually, and engagement of the clutch C3 is released (see times t22 to t23 in FIG. 7). Further, when the shift lever 91 is switched from the R position to the D position, communication between the input port 58a receiving the line pressure PL and the R position output port 58c in the manual valve 58 is blocked, and thus the brake pressure PB2 acting on the brake B2 from the R position output port 58c becomes close to the value 0 (see times t22 to t23 in FIG. 7). Subsequently, the fast fill is performed for the clutch C1 (step S270), and the linear solenoid SLC1 is drive-controlled so that the SLC1 pressure as the output pressure of the linear solenoid SLC1 is increased gradually (step S280). Then, upon elapsing of the predetermined time T from when the shift lever 91 is switched from the R position to the D position (step S290), the on-off solenoid S1 is turned off and the on-off solenoid S2 is turned on (step S300). Accordingly, since both the on-off solenoids S1, S2 output the signal pressure, the SLC2 pressure of the linear solenoid SLC2 is supplied to the brake B2 side, and the SLC3 pressure of the linear solenoid SLC3 is blocked. Then the linear solenoid SLC2 is drive-controlled so that the SLC2 pressure of the linear solenoid SLC2 becomes the aforementioned predetermined pressure P0, and is held constant at this predetermined pressure P0 (step S310). The linear solenoid SLC1 is drive-controlled so that the SLC1 pressure of the linear solenoid SLC1 becomes maximum accompanying engagement of the clutch C1 (S320), and this routine is finished. Thus, the clutch C1 is engaged and the brake B2 is engaged, thereby forming the first forward speed of the D position. In this manner, when the shift lever 91 is in the R position, the brake B2 is engaged by the oil pressure PR from the R position output port 58c of the manual valve 58, and the clutch C3 is engaged by the SLC3 pressure from the linear solenoid SLC3. When the shift lever 91 is in the D position, the brake B2 is engaged by supplying the SLC2 pressure from the linear solenoid SLC2 to the brake B2, and the clutch C1 is engaged by supplying the SLC1 pressure from the linear solenoid SLC1 to the clutch C1. Thus, it is possible to eliminate the need for providing a dedicated linear solenoid for engaging the brake B2.

In the embodiment, when the shift lever 91 is in the N position, the SLC3 pressure of the linear solenoid SLC3 is used to engage the brake B2, and when the shift lever 91 is in the D position, the SLC2 pressure of the linear solenoid SLC2 is used to engage the brake B2. This is based on that the SLC3 pressure of the linear solenoid SLC3 can be used to engage the brake B2 when in the D position similarly to when in the N position, but in this case, since the linear solenoid SLC3 is structured to supply the SLC3 pressure to the clutch C3 for forming the third forward speed, it becomes necessary to switch engagement from the clutch C3 to the brake B2 by one linear solenoid SLC3 when downshifting from the third forward speed to the first forward speed (when engine braking), which hinders smooth downshifting.

In the transmission apparatus of the embodiment described above, when the shift lever 91 is in the R position, the brake B2 is engaged by the reverse pressure PR from the R position output port 58c of the manual valve 58, and the clutch C3 is engaged by the SLC3 pressure from the linear solenoid SLC3 to thereby form the state of the first reverse speed. When the shift lever 91 is in the N position, the brake B2 is engaged by supplying the SLC3 pressure from the linear solenoid SLC3 to the brake B2 instead of the clutch C3 to thereby form the state of neutral. Thus, there is no need for providing a dedicated linear solenoid for engaging the brake B2. Consequently, by suppressing increase in consumption flow rate (energy consumption) in the hydraulic circuit 50 due to separately providing a linear solenoid, energy efficiency of the entire apparatus can be improved, and the entire apparatus can be downsized. Since the brake B2, out of the clutch C3 and the brake B2 to be engaged in the R position, is engaged in the N position in advance, only the clutch C3 needs to be engaged when switching from the N position to the R position. Thus, the response to a shift operation can be increased further. Moreover, when the shift lever 91 is in the D position, the brake B2 is engaged by supplying the brake B2 with the SLC2 pressure from the linear solenoid SLC2, which is different from the linear solenoid SLC3 supplying an oil pressure to the clutch C3 that is used for forming the third forward speed, and the clutch C1 is engaged by supplying the SLC1 pressure from the linear solenoid SLC1 to the clutch C1. Thus, downshifting from the third forward speed to the first forward speed can be performed smoothly. Furthermore, when the shift lever 91 is in the D position (at the time of no engine braking with the first forward speed) or in the N position, the engagement pressure of the brake B2 is set to the predetermined pressure P0, which is the minimum required pressure, and thus the consumption flow rate (energy consumption) of the hydraulic circuit 50 can be suppressed further.

Figure 8:
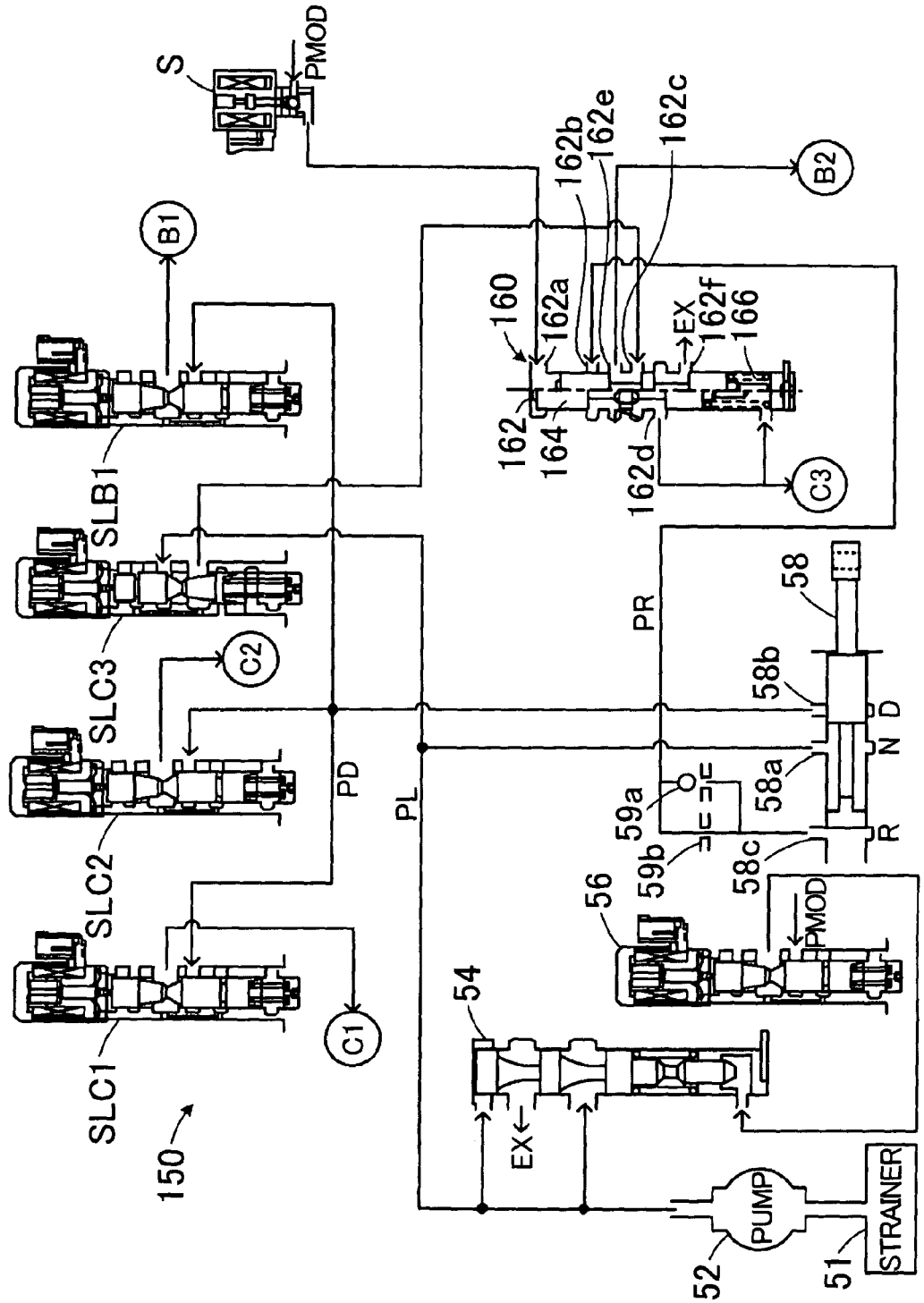
FIG. 8 is a structural diagram showing an overview of the structure of a hydraulic circuit 150 included in a transmission apparatus of a second embodiment.
Figures 9, 10:
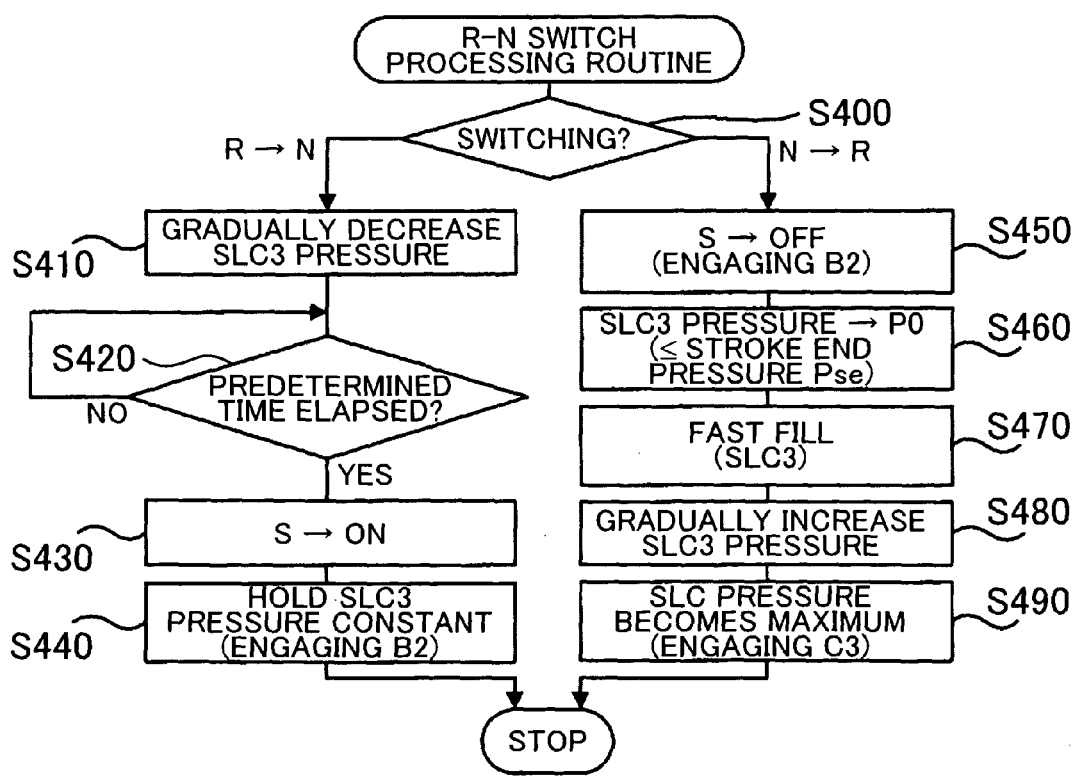
FIG. 9 is an operation table of the automatic transmission 20 when the hydraulic circuit 150 is used.
FIG. 10 is a flowchart showing an example of an R-N switch processing routine executed by the ATECU 29.

Next, a transmission apparatus of a second embodiment will be described. FIG. 8 is a structural diagram showing an overview of the structure of a hydraulic circuit 150 included in the transmission apparatus of the second embodiment. Note that for the transmission apparatus of the second embodiment, the same elements as those in the transmission apparatus of the embodiment are denoted by the same reference numerals, and overlapping descriptions thereof are omitted. As shown in the diagram, instead of the three relay valves, which are the C3 relay valve 60, the C2 relay valve 70, and the B2 relay valve 80, and the normal open type on-off solenoid S1 and the normal close type on-off solenoid S2 for driving the three relay valves included in the hydraulic circuit 50 of the embodiment, the hydraulic circuit 150 of the second embodiment has a C3 relay valve 160 switching between a state that the SLC3 pressure, which is the output pressure from the linear solenoid SLC3, is output to the clutch C3 and the reverse pressure PR, which is the output pressure from the R position output port 58c of the manual valve 58, is output to the brake B2 and a state that the SLC3 pressure is output to the brake B2 and the reverse pressure PR is blocked, and a normal close type on-off solenoid S driving the C3 relay valve 160. An operation table of the automatic transmission 20 when using this hydraulic circuit 150 is shown in FIG. 9.

The C3 relay valve 160 is structured from, as shown in FIG. 8, a sleeve 162 in which a signal pressure input port 162a receiving a signal pressure from the on-off solenoid S, an input port 162b receiving the reverse pressure PR from the R position output port 58c of the manual valve 58, an input port 162c receiving the output pressure (SLC3 pressure) from the linear solenoid SLC3, an output port 162d outputting an oil pressure to the clutch C3, an output port 162e outputting an oil pressure to the brake B2, and a drain port 162f are formed, a spool 164 sliding in the sleeve 162 in an axial direction, and a spring 166 biasing the spool 164 in the axial direction. In this C3 relay valve 160, when the signal pressure is not input from the on-off solenoid S to the signal pressure input port 162a, the spool 164 moves to a position shown in a left-half region in the diagram by the biasing force of the spring 166, thereby allowing communication between the input port 162b (the side of the R position output port 58c of the manual valve 58) and the output port 162e (the brake B2 side) and allowing communication between the input port 162c (the side of the output port of the linear solenoid SLC3) and the output port 162d (the clutch C3 side). On the other hand, when the signal pressure is input from the on-off solenoid S to the signal pressure input port 162a, this signal pressure overcomes the biasing force of the spring 166 and the spool 164 moves to a position shown in a right-half region in the diagram, thereby blocking the input port 162b (the side of the R position output port 58c of the manual valve 58) and blocking communication between the input port 162c (the side of the output port of the linear solenoid SLC3) and the output port 162d (the clutch C3 side), and allowing communication between the input port 162c and the output port 162e (the brake B2 side). When the communication between the input port 162c (the side of the output port of the linear solenoid SLC3) and the output port 162d (the clutch C3 side) is blocked, the output port 162d and the drain port 162f communicate with each other accompanying this, and the operating oil supplied to the clutch C3 is drained.

Figure 11:
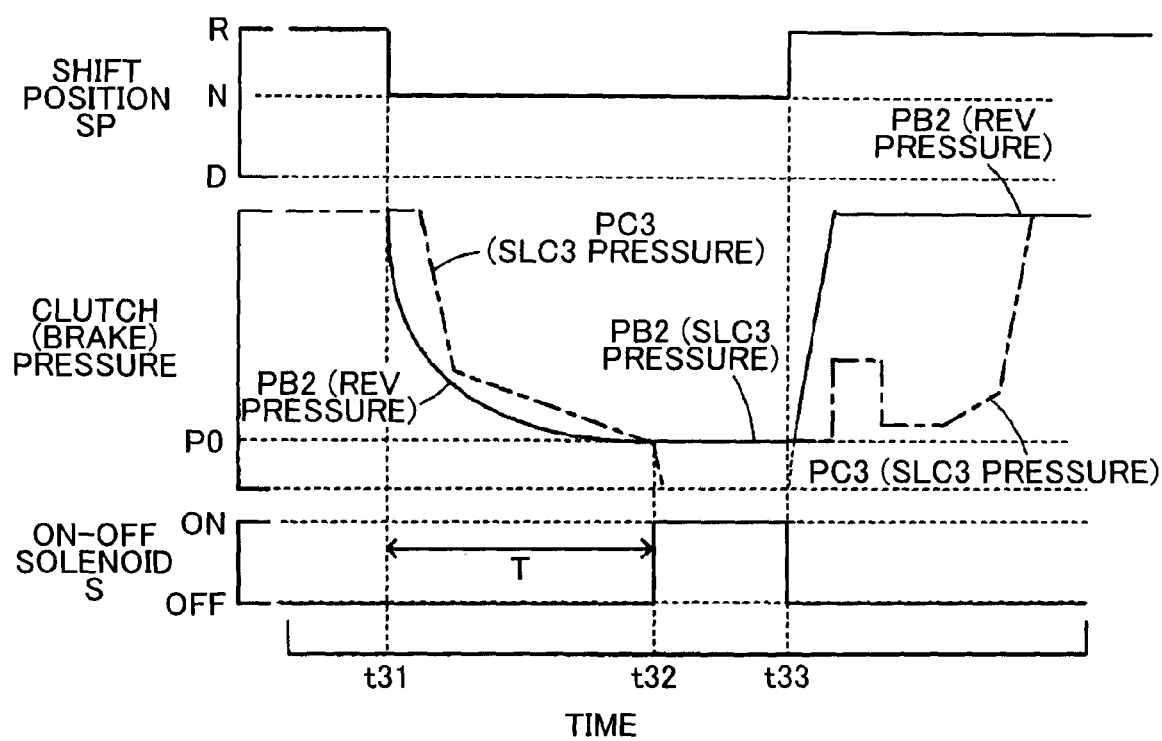
FIG. 11 is a time chart when a shift lever 91 is changed between the R position and the N position.

Next, operation of the transmission apparatus of the second embodiment thus structured will be described. FIG. 10 is a flowchart showing an example of R-N switch processing routine executed by the ATECU 29. This routine is executed when the shift lever 91 is switched from the R position to the N position or from the N position to the R position. In the following, the routine in FIG. 10 will be described with reference to a time chart illustrated in FIG. 11.

When the R-N switch processing routine is executed, the CPU of the ATECU 29 first determines whether the shift lever 91 is switched from the R position to the N position or from the N position to the R position (step S400). When the shift lever 91 is switched from the R position to the N position (time t31 in FIG. 11), the linear solenoid SLC3 is drive-controlled so that the SLC3 pressure as the output pressure from the linear solenoid SLC3 decreases gradually (step S410). Accordingly, a clutch pressure PC3 acting on the clutch C3 becomes small gradually, and engagement of the clutch C3 is released (see times t31 to t32 in FIG. 11). Further, when the shift lever 91 is switched from the R position to the N position, a brake pressure PB2 acting on the brake B2 gradually becomes close to the value 0 (see times t31 to t32 in FIG. 11). Subsequently, upon elapsing of a predetermined time T (time t32 in FIG. 11) by which the SLC3 pressure approximates to a predetermined pressure P0 after the shift lever 91 is switched from the R position to the N position (step S420), the on-off solenoid S is turned on (step S430), the linear solenoid SLC3 is drive-controlled so that the SLC3 pressure is held constant at the predetermined pressure P0 (step S440), and this routine is finished. As described above, the on-off solenoid S is structured as a normal close type solenoid. When the on-off solenoid S is turned on, the signal pressure is output from the on-off solenoid S, resulting in that the SLC3 pressure from the linear solenoid SLC3 is supplied to the brake B2 via the C3 relay valve 160. In the embodiment, after the on-off solenoid S is turned on, the linear solenoid SLC3 is drive-controlled so that the SLC3 pressure is held constant at the predetermined pressure P0, resulting in that the predetermined pressure P0 acts on the brake B2 to engage the brake B2. Here, the predetermined pressure P0 in the embodiment is set to the oil pressure to a degree that a piston of the brake B2 comes in contact with a friction plate (that is, an oil pressure equal to or lower than a stroke end pressure Pse). When the shift lever 91 is in the N position, it is not necessary to fully engage the brake B2. Thus, engaging the brake B2 by the predetermined pressure P0, which is the minimum required pressure, enables suppression of energy consumption.

On the other hand, when the shift lever 91 is switched from the N position to the R position (time t33 in FIG. 11), the on-off solenoid S is turned off (step S450), and the linear solenoid SLC3 is drive-controlled so that the SLC3 pressure of the linear solenoid SLC3 becomes the predetermined pressure P0 that is equal to or lower than the stroke end pressure Pse (step S460). When the on-off solenoid S is turned off, the on-off solenoid S no longer outputs the signal pressure. Thus, the SLC3 pressure from the linear solenoid SLC3 is supplied to the clutch C3 by the C3 relay valve 160, and the line pressure is supplied as the reverse pressure PR to the brake B2 via the input port 58a and the R position output port 58c of the manual valve 58. Then a fast fill for quickly filling operating oil is performed to fill a pack clearance of the clutch C3 (step S470). The SLC3 pressure increases gradually after the fast fill is completed (S480), the linear solenoid SLC3 is drive-controlled so that the SLC3 pressure becomes maximum accompanying engagement of the clutch C3 (step S490), and this routine is finished. Thus, the clutch C3 is engaged and the R position is formed. In this manner, when the shift lever 91 is in the R position, the brake B2 is engaged by the reverse pressure PR from the R position output port 58c of the manual valve 58, and the clutch C3 is engaged by the SLC3 pressure of the linear solenoid SLC3. When the shift lever 91 is in the N position, the brake B2 is engaged by supplying the SLC3 pressure from the linear solenoid SLC3 to the brake B2 instead of the clutch C3. Thus, it is possible to eliminate the need for providing a dedicated linear solenoid for engaging the brake B2.

Figure 12:
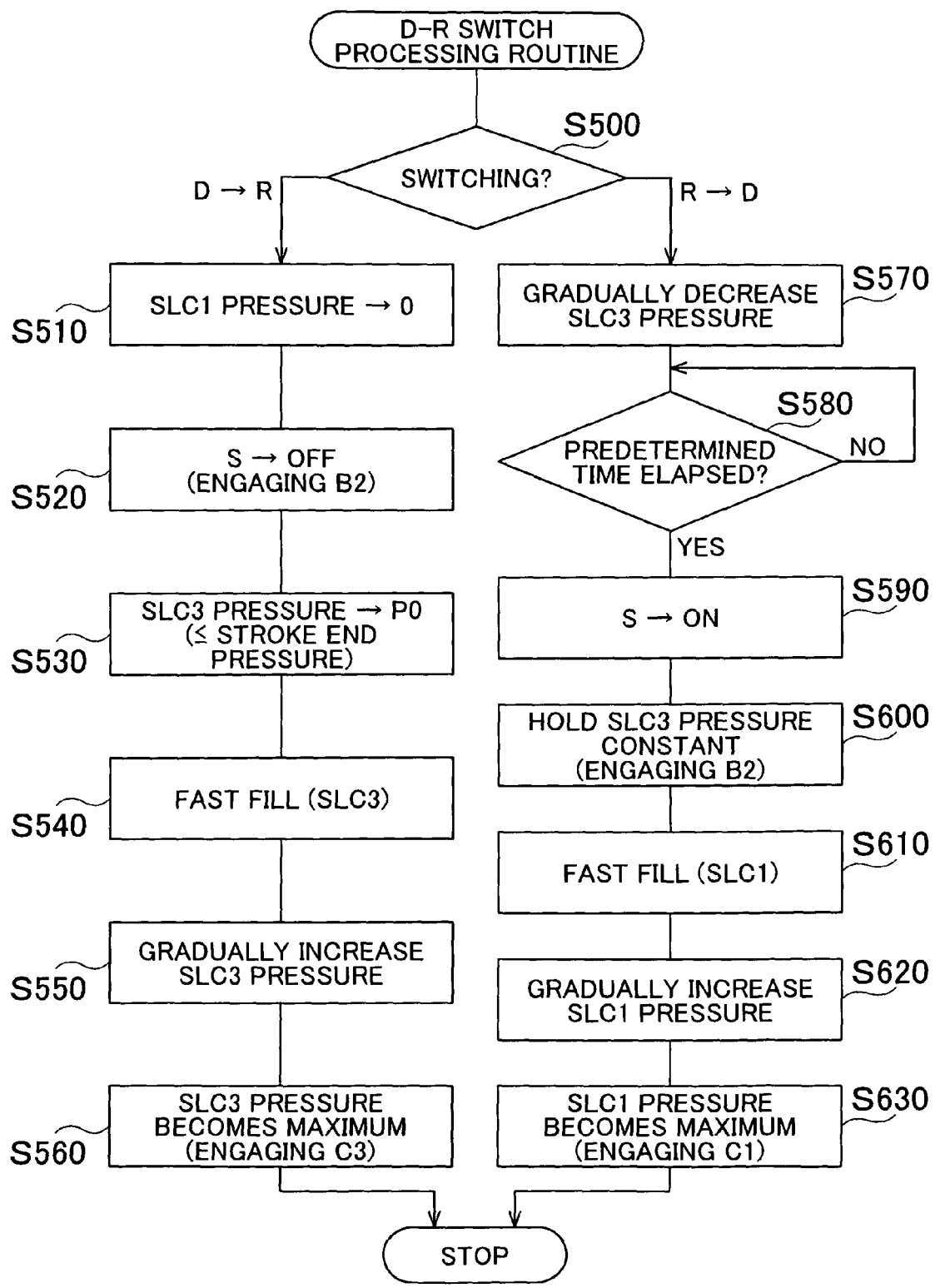
FIG. 12 is a flowchart showing an example of a D-R switch processing routine executed by the ATECU 29.
Figure 13:
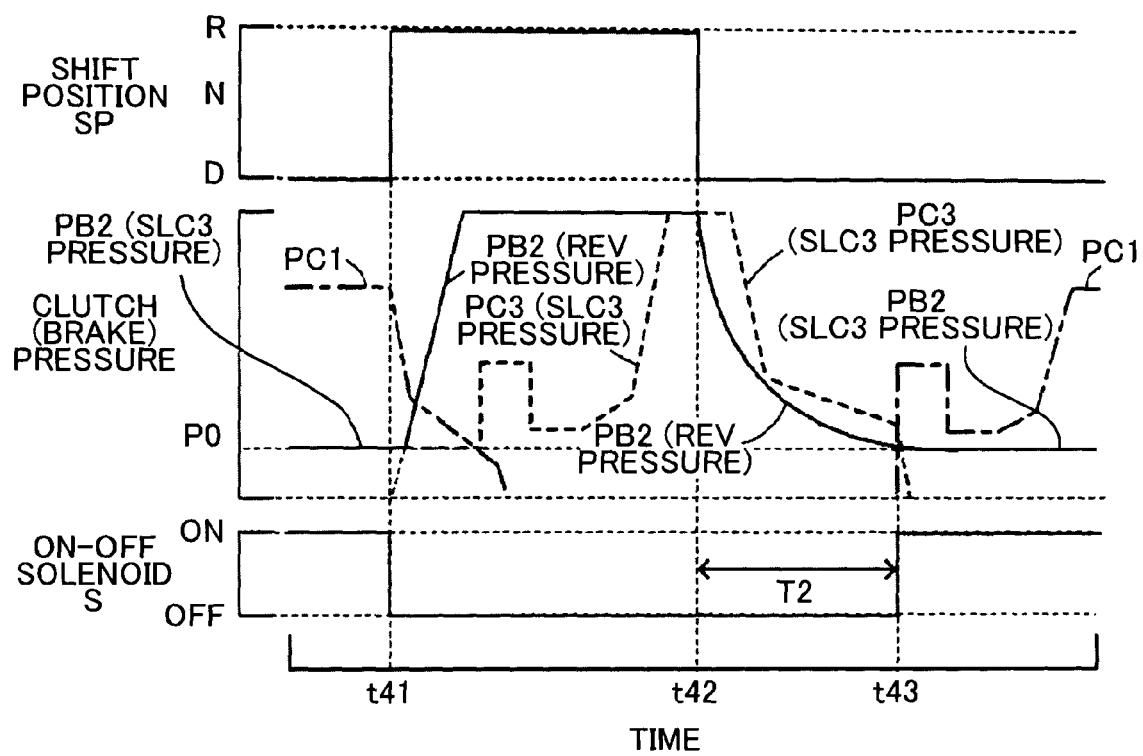
FIG. 13 is a time chart when the shift lever 91 is changed between the D position and the R position.

Next, the operation when the shift lever 91 is changed between the D position and the R position will be described. FIG. 12 is a flowchart showing an example of a D-R switch processing routine executed by the ATECU 29. This routine is executed when the shift lever 91 is switched from the D position to the R position or from the R position to the D position. In the following, the routine in FIG. 12 will be described with reference to a time chart illustrated in FIG. 13.

When the D-R switch processing routine is executed, the CPU of the ATECU 29 first determines whether the shift lever 91 is switched from the D position to the R position or from the R position to the D position (step S500). When the shift lever 91 is switched from the D position to the R position (time t41 in FIG. 13), the linear solenoid SLC1 is drive-controlled so that the SLC1 pressure as the output pressure from the linear solenoid SLC1 becomes the value 0 so as to release engagement of the clutch C1 (step S510), and the on-off solenoid S is turned off (step S520). Accordingly, since the on-off solenoid S no longer outputs the signal pressure, the SLC3 pressure of the linear solenoid SLC3 is supplied to the clutch C3 side by the C3 relay valve 160, and the line pressure is supplied as the reverse pressure PR via the input port 58a and the R position output port 58c of the manual valve 58 to the brake B2 side. Then, the linear solenoid SLC3 is drive-controlled so that the SLC3 pressure of the linear solenoid SLC3 becomes the predetermined pressure P0 that is equal to or lower than the stroke end pressure Pse (step S530), and the aforementioned fast fill is performed for the clutch C3 (step S540). The SLC3 pressure of the linear solenoid SLC3 is increased gradually (S550), the linear solenoid SLC3 is drive-controlled so that the SLC3 pressure becomes maximum accompanying engagement of the clutch C3 (step S560), and this routine is finished.

On the other hand, when the shift lever 91 is switched from the R position to the D position (time t42 in FIG. 13), the linear solenoid SLC3 is drive-controlled so that the SLC3 pressure of the linear solenoid SLC3 decreases gradually (step S570). Accordingly, the clutch pressure PC3 acting on the clutch C3 decreases gradually, and engagement of the clutch C3 is released (see times t42 to t43 in FIG. 13). Further, when the shift lever 91 is switched from the R position to the D position, communication between the input port 58a receiving the line pressure PL and the R position output port 58c in the manual valve 58 is blocked, and thus the brake pressure PB2 acting on the brake B2 from the R position output port 58c becomes close to the value 0 (see times t42 to t43 in FIG. 13). Subsequently, upon elapsing of a predetermined time T2 (time t43 in FIG. 13) by which the brake pressure PB2 approximates the predetermined pressure P0 after the shift lever 91 is switched from the R position to the D position (step S580), the on-off solenoid S is turned on (step S590), and the linear solenoid SLC3 is drive-controlled so that the SLC3 pressure is held constant at the predetermined pressure P0 (step S600). Accordingly, since the on-off solenoid S outputs the signal pressure, the SLC3 pressure of the linear solenoid SLC3 is supplied to the brake B2 side by the C3 relay valve 160, resulting in that the brake B2 is engaged by the predetermined pressure P0. Then the linear solenoid SLC1 is drive-controlled to perform the fast fill for the clutch C1 (step S610), the SLC1 pressure that is the output pressure of the linear solenoid SLC1 is increased gradually (step S620), the linear solenoid SLC1 is drive-controlled so that the SLC1 pressure of the linear solenoid SLC1 becomes maximum accompanying engagement of the clutch C1 (step S630), and this routine is finished. Thus, the clutch C1 is engaged and the brake B2 is engaged, thereby forming the first forward speed of the D position. In this manner, when the shift lever 91 is in the R position, the brake B2 is engaged by the reverse pressure PR from the R position output port 58c of the manual valve 58, and the clutch C3 is engaged by the SLC3 pressure from the linear solenoid SLC3. When the shift lever 91 is in the D position, the brake B2 is engaged by supplying the SLC3 pressure from the linear solenoid SLC3 to the brake B2, and the clutch C1 is engaged by supplying the SLC1 pressure from the linear solenoid SLC1 to the clutch C1. Thus, it is possible to eliminate the need for providing a dedicated linear solenoid for engaging the brake B2.

In the transmission apparatus in the embodiment or the second embodiment, the SLC3 pressure of the linear solenoid SLC3 is used to engage the brake B2 when the shift lever 91 is in the N position, and the SLC2 pressure of the linear solenoid SLC2 is used to engage the brake B2 when the shift lever 91 is in the D position (at the time of no engine braking with the first forward speed). However, the present invention is not limited thereto. When in the D position, the SLC3 pressure of the linear solenoid SLC3 may be used to engage the brake B2, similarly to when in the N position.

In the transmission apparatus in the embodiment or the second embodiment, the brake B2 is engaged when the shift lever 91 is in the D position (at the time of no engine braking with the first forward speed). However, at the time of no engine braking with the first forward speed, the one-way clutch F1 is engaged instead of the brake B2, and thus the brake B2 need not be engaged.

In the transmission apparatus in the embodiment or the second embodiment, the linear solenoids SLC1 to SLC3 are formed as linear solenoids for direct control, which directly controls the corresponding clutches and brakes by generating the optimal clutch pressure from the line pressure PL. However, linear solenoids may be used as ones for pilot control so as to drive control valves separately, and the clutch pressures may be generated by these control valves to control the corresponding clutches and brakes.

In the transmission apparatus in the embodiment or the second embodiment, the automatic transmission 20 is structured as a multi-speed transmission with six speeds of first to sixth forward speeds. However, the present invention is not limited to this. The automatic transmission may be structured as a multi-speed transmission with two to five speeds, or a multi-speed transmission with seven or more speeds.

Here, the correspondence between the major elements of the embodiments and the major elements of the invention described in the Disclosure of the Invention section will be described. In the embodiments, the brake B2 corresponds to the "first engagement element", and the clutch C3 corresponds to the "second engagement element". The mechanical oil pump 52, the regulator valve 54, and the linear solenoid 56 correspond to the "pressure feeding unit". The manual valve 58 corresponds to the "fluid pressure input/output unit", and the linear solenoid SLC3 corresponds to the "first pressure regulating unit". The C3 relay valve 60, the C2 relay valve 70, the B2 relay valve 80, and the on-off solenoids S1, S2 correspond to the "selective output unit". Further, the clutch C1 corresponds to the "third engagement element", the clutch C2 or the clutch C3 corresponds to the "fourth engagement element", and the linear solenoid SLC2 corresponds to the "second pressure regulating unit". Furthermore, the C3 relay valve 60, the C2 relay valve 70, and the B2 relay valve 80 correspond to the "switching valve", and the on-off solenoids S1, S2 correspond to the "signal pressure output unit". The C3 relay valve 160 also corresponds to the "switching valve". Further, the C3 relay valve 60 corresponds to the "first switching valve", the B3 relay valve 80 corresponds to the "second switching valve", and the C2 relay valve 70 corresponds to the "third switching valve". Moreover, the output port 62d and the output port 162e correspond to the "first output port", the output port 62c and the output port 162d correspond to the "second output port", the output port 72e corresponds to the "third output port", and the output port 72d corresponds to the "fourth output port". The input port 82e and the input port 162c correspond to the "first input port", the input port 82b and the input port 162b correspond to the "second input port", the input port 72b corresponds to the "third input port", and the input port 72c corresponds to the "fourth input port". It should be noted that the embodiments are examples for specifically describing the invention described in the Disclosure of the Invention section, and thus the correspondence between the major elements of the embodiments and the major elements of the invention described in the Disclosure of the Invention section does not limit the elements of the invention described in the Disclosure of the Invention section. That is to say, the invention described in the Disclosure of the Invention section should be construed based on the description in that section, and the embodiments are merely specific examples of the invention described in the Disclosure of the Invention section.

In the foregoing, the embodiments of the present invention have been described, but the present invention is not limited to such embodiments at all. It is needless to mention that the present invention can be implemented in various modes within the scope of the present invention without departing therefrom.

The present invention can be used in the automobile industry and the like.

The invention claimed is:

1. A transmission apparatus including an automatic transmission that is mounted in a vehicle and is capable of engaging a first engagement element and a second engagement element among a plurality of engagement elements when shift-operated to a reverse position, and engaging the first engagement element when shift-operated to a neutral position, the transmission apparatus comprising:

a pressure feeding unit adjusting a fluid pressure of a fluid pressure source and outputting the fluid pressure as a line pressure;

a fluid pressure input/output unit receiving the line pressure and outputting from a reverse position output port among a plurality of output ports when shift-operated to the reverse position, and blocking the plurality of output ports when shift-operated to the neutral position;

a first pressure regulating unit receiving and adjusting the line pressure and outputting a fluid pressure which is the line pressure adjusted; and a selective output unit outputting to the first engagement element the line pressure output from the reverse position output port and outputting to the second engagement element the fluid pressure output from the first pressure regulating unit when shift-operated to the reverse position, and outputting to the first engagement element the fluid pressure output from the first pressure regulating unit when shift-operated to the neutral position.

2. The transmission apparatus according to claim 1, which is capable of, when shift-operated to a forward position, forming a shift speed for starting by engaging the first engagement element and a third engagement element among the plurality of engagement elements, and forming a shift speed other than the shift speed for starting by engaging at least a fourth engagement element among the plurality of engagement elements, wherein the selective output unit is a unit selectively outputting the fluid pressure output from the first pressure regulating unit to the fourth engagement element or the first engagement element when shift-operated to the forward position.

3. The transmission apparatus according to claim 2, wherein the fourth engagement element is an element capable of, when shift-operated to the forward position, forming a shift speed which does not involve direct switching to or from the shift speed for starting.

4. The transmission apparatus according to claim 1, wherein the first pressure regulating unit is a unit adjusting the line pressure when shift-operated to the neutral position, in by a low engagement pressure lower than an engagement pressure when the first engagement element is fully engaged.

5. The transmission apparatus according to claim 1, wherein the selective output unit is a unit including:

a switching valve that has a first input port receiving the fluid pressure output from the first pressure regulating unit, a second input port receiving the line pressure output from the reverse position output port of the fluid pressure input/output unit, a first output port outputting the fluid pressure to the first engagement element, and a second output port outputting the fluid pressure to the second engagement element, and that selectively switches between a state that the fluid pressure input to the first input port is output from the first output port and a state that the fluid pressure input to the first input port is output from the second output port and the fluid pressure input to the second input port is output from the first output port; and a signal pressure output unit outputting a signal pressure for driving the switching valve.

6. The transmission apparatus according to claim 1, which is capable of, when shift-operated to a forward position, forming a shift speed for starting by engaging the first engagement element and a third engagement element among the plurality of engagement elements, and forming a shift speed other than the shift speed for starting by engaging at least a fourth engagement element among the plurality of engagement elements, wherein the fluid pressure input/output unit is a unit receiving the line pressure and outputting from a forward position output port among the plurality of output ports when shift-operated to the forward position;

the transmission apparatus includes a second pressure regulating unit receiving and adjusting the line pressure output from the forward position output port and outputting a fluid pressure which is the line pressure adjusted; and the selective output unit is a unit selectively outputting the fluid pressure output from the second pressure regulating unit to the fourth engagement element or to the first engagement element in the forward position when shift-operated to the forward position.

7. The transmission apparatus according to claim 6, wherein the fourth engagement element is an element capable of, when shift-operated to the forward position, forming a shift speed which does not involve direct switching to or from the shift speed for starting.

8. The transmission apparatus according to claim 6, wherein the selective output unit outputs the fluid pressure output from the first pressure regulating unit to the second engagement element when shift-operated to the forward position; and the second engagement element is an element capable of, when shift-operated to the forward position, forming a shift speed which is other than the shift speed for starting and involves direct switching to or from the shift speed for starting.

9. The transmission apparatus according to claim 6, wherein the first pressure regulating unit is a unit adjusting the line pressure when shift-operated to the neutral position, in a low engagement pressure lower than an engagement pressure when the first engagement element is fully engaged.

10. The transmission apparatus according to claim 7, wherein the unit is a unit adjusting the line pressure when shift-operated to the neutral position, in a low engagement pressure lower than an engagement pressure when the first engagement element is fully engaged.

11. The transmission apparatus according to claim 1, wherein the selective output unit is a unit including:

a first switching valve receiving the fluid pressure output from the first pressure regulating unit and selectively outputting the fluid pressure to a first output port or a second output port supplying the fluid pressure to the second engagement element;

a second switching valve that has a first input port receiving the fluid pressure output from the first output port of the switching valve and a second input port receiving the line pressure output from the reverse position output port of the fluid pressure input/output unit, and that selectively outputs the fluid pressure input to the first and second input ports to the first engagement elements; and a signal pressure output unit outputting a signal pressure for driving the first and second switching valves.

12. The transmission apparatus according to claim 6, wherein the selective output is a unit including;

a first switching valve receiving the fluid pressure output from the first pressure regulating unit and selectively outputting the fluid pressure to a first output port or to a second output port supplying the fluid pressure to the second engagement element;

a second switching valve that has a first input port and a second input port receiving the line pressure output from the reverse position output port of the fluid pressure input/output unit, and that selectively inputs the fluid pressure through the first or second input port, and outputs the fluid pressure to the first engagement element;

a third switching valve that has a third input port receiving the fluid pressure output from the first output port of the first switching valve, a fourth input port receiving the fluid pressure output from the second pressure regulating unit, a third output port outputting the fluid pressure to the first input port of the second switching valve, and a fourth output port outputting the fluid pressure to the fourth engagement element, and that outputs the fluid pressure input to the fourth input port to the third output port or inputs the fluid pressure through the third input port and outputs the fluid pressure to the third output port, and inputs the fluid pressure through the fourth input port and outputs the fluid pressure to the fourth engagement element; and a signal pressure output unit outputting a signal pressure for driving the first to third switching valves.

13. A vehicle comprising the transmission apparatus according to claim 1.

* * * * *